United States Patent
Chu et al.

(10) Patent No.: US 7,234,111 B2
(45) Date of Patent: Jun. 19, 2007

(54) DYNAMIC ADAPTATION OF GUI PRESENTATIONS TO HETEROGENEOUS DEVICE PLATFORMS

(75) Inventors: Hao-hua Chu, Mountain View, CA (US); Hoi Lee Candy Wong, Santa Clara, CA (US); Yu Song, San Carlos, CA (US); Shoji Kurakake, San Francisco, CA (US)

(73) Assignee: NTT Docomo, Inc., Tokyo (JP)

( * ) Notice: Subject to any disclaimer, the term of this patent is extended or adjusted under 35 U.S.C. 154(b) by 502 days.

(21) Appl. No.: 09/967,167

(22) Filed: Sep. 28, 2001

(65) Prior Publication Data
US 2004/0163046 A1 Aug. 19, 2004

(51) Int. Cl.
*G06F 17/00* (2006.01)
(52) U.S. Cl. .................. 715/517; 715/526; 715/762
(58) Field of Classification Search ............. 345/762, 345/733, 788; 715/517, 518, 520, 521, 526, 715/700, 733, 762, 788
See application file for complete search history.

(56) References Cited

U.S. PATENT DOCUMENTS

| | | | | |
|---|---|---|---|---|
| 5,583,983 | A * | 12/1996 | Schmitter ................ | 717/138 |
| 5,845,303 | A * | 12/1998 | Templeman ............. | 715/517 |
| 5,895,477 | A * | 4/1999 | Orr et al. ................ | 715/517 |
| 5,956,738 | A * | 9/1999 | Shirakawa .............. | 715/517 |
| 5,969,717 | A * | 10/1999 | Ikemoto ................. | 345/762 |
| 6,037,939 | A * | 3/2000 | Kashiwagi et al. ...... | 345/798 |
| 6,097,382 | A * | 8/2000 | Rosen et al. ........... | 345/762 |
| 6,285,366 | B1 * | 9/2001 | Ng et al. ................ | 715/853 |
| 6,310,601 | B1 * | 10/2001 | Moore et al. ........... | 345/660 |
| 6,317,143 | B1 * | 11/2001 | Wugofski ............... | 345/765 |
| 6,353,448 | B1 * | 3/2002 | Scarborough et al. ... | 715/744 |

(Continued)

FOREIGN PATENT DOCUMENTS

JP 07-244568 9/1995

(Continued)

OTHER PUBLICATIONS

Rist, Thomas, Brandmeier, Patrick, Gerd, Herzog, and Andre, Elisabeth, "Getting the Mobile Users in: Three Systems that Support Collaboration in an Environment with Heterogeneous Communication Devices", ACM, May 2000, pp. 250-254.*

(Continued)

*Primary Examiner*—William Bashore
*Assistant Examiner*—L. Ries
(74) *Attorney, Agent, or Firm*—Blakely, Sokoloff, Taylor & Zafman LLP

(57) ABSTRACT

A system for dynamically adapting a presentation generated with a scalable application to a display screen of any of a plurality of heterogeneous device platforms is disclosed. The system includes a device platform and a transformation module. The device platform is one of the heterogeneous device platforms and includes a display screen. The device platform is operable to initiate generation of a hierarchical configuration representing a plurality of graphical user interface components. The transformation module is operable to selectively arrange the graphical user interface components on a page as a function of the hierarchical configuration. In the addition, the transformation module is operable to selectively transform the graphical user interface components to maximize the fill of the display screen by the page.

50 Claims, 10 Drawing Sheets

U.S. PATENT DOCUMENTS

| | | | |
|---|---|---|---|
| 6,429,882 B1* | 8/2002 | Abdelnur et al. | 345/763 |
| 6,636,250 B1* | 10/2003 | Gasser | 345/853 |
| 6,650,347 B1* | 11/2003 | Nulu et al. | 345/853 |
| 6,765,578 B2* | 7/2004 | Slavin | 345/472 |
| 2002/0167543 A1* | 11/2002 | Smith et al. | 345/762 |
| 2003/0200254 A1* | 10/2003 | Wei | 709/203 |

FOREIGN PATENT DOCUMENTS

| | | |
|---|---|---|
| JP | 08-263243 | 10/1996 |

OTHER PUBLICATIONS

Miyashita, Ken, Matsuoka, Satoshi, Takahashi, Shin, and Yonezawa, Akinori, "Interactive Generation of Graphical User Interfaces by Multiple Visual Examples", ACM, Nov. 1994, pp. 85-94.*

"UIML Reference Manual", Harmonia, Inc, Dec. 1997, downloaded from http://www.uiml.org/specs/docs/uiml_v10_ref.PDF, pp. 1-132.*

"User Interface Markup Language (UIML) Draft Specification", Harmonia, Inc, Version 7, Jan. 2000, downloaded from http://www.uiml.org/specs/docs/uiml20-17Jan00.pdf, pp. 1-64.*

Eisenstein, J., Vanderdonckt, J. and Puerta, A., "Applying Model-Based Techniques to the Development of UIs for Mobile Computers," Proc. of IUI'01, Jan. 14-17, 2001.

Eisenstein, J., Vanderdonckt, J. and Puerta, A., "Adapting to Mobile Contexts with User-Interface Modeling," In Proceedings of WMCSA' 00, Dec. 2000.

* cited by examiner

DYNAMIC ADAPTATION OF GUI PRESENTATIONS TO HETEROGENEOUS DEVICE PLATFORMS

FIELD OF THE INVENTION

The present invention relates generally to graphical user interfaces (GUI) and, more particularly, to a scalable GUI architecture to adapt applications to the user interface of different heterogeneous device platforms.

BACKGROUND OF THE INVENTION

Personal electronic devices such as personal computers, personal digital assistants (PDAs), wireless telephones and pagers have become prevalent in recent years. These devices allow mobile computing by communication over wireless and/or wireline networks. The networks provide interconnection of these mobile devices with information sources as well as other similar devices. Commonly, the networks include communication over the Internet.

Typically, mobile computing devices include some form of user interface (UI). The nature of the user interface on a device is a function of the computing power and the hardware represented on the device. For example, a wireless telephone has limited computing power and a relatively small graphical user interface (GUI) with limited graphics and user interface capability. Conversely, a notebook personal computer has relatively extensive graphics capability, user interface capability and computing power. As the popularity of mobile devices increases, the main device platform for applications may shift from desktop personal computers to mobile devices.

One significant difficulty with developing applications for mobile devices is device heterogeneity. Due to variations in display size, display resolution, command input methods and GUI libraries, an application developer may have to re-design and re-implement applications for the graphical user interfaces (GUIs) of each device platform. With the large number of different mobile devices currently available, or coming into the market, re-design and re-implementation may be an ongoing, labor intensive and cost prohibitive endeavor.

One solution is through the development of model-based techniques. An exemplary model-based technique is user interface modeling. In general, user interface modeling involves a platform model, a presentation model and a task model. The platform model describes the operational functionality forming the user interface for each device supported. The presentation model, describes the hierarchy, stylistic choices, selection and placement regarding the visual appearance of the user interface associated with the supported device(s). The task model identifies tasks that a user of the supported device(s) may perform. With this technique, mappings between the various models may be developed to produce a user interface for a particular device.

Implementation of the model-based approach typically includes development of a high level language to implement the models. In addition, developers typically build and specify significant portions of the models to support the devices. Since the high level language is fairly complex, developers usually must learn the language, as well as the execution mechanics, prior to implementing the model-based approach. Further, model-based approaches typically generate code based on the different model(s) that the developer builds. Slight differences in the user interface requirements of a device may result in considerable differences in the code generated for two seemingly similar devices. Accordingly, the complexity and level of programming expertise required by the developer is significant.

SUMMARY OF THE PRESENT INVENTION

The present invention discloses a non-model based scalable graphical user interface (SGUI) architecture. The SGUI architecture allows scaleable applications to operate on any of a plurality of heterogeneous device platforms. The scaleable applications may include an application graphical user interface (GUI). The application GUI may be adapted by the SGUI architecture to operate with the user interface of one of the heterogeneous device platforms on which the scaleable application is operating. Application developers may build application GUIs that are independent of the user interface capabilities within each of the heterogeneous device platforms without the complexities of the model-based approach. In addition, many of the complexities of user interfaces and GUI libraries associated with each of the heterogeneous device platforms may be avoided by application developers by utilizing the SGUI architecture.

The SGUI architecture includes a scalable GUI library, a customizing module and a render manager module. The customizing module includes a task manager module and a transformation manager module. When a scaleable application is launched or migrated to one of the heterogeneous device platforms (which may be referred to as a target device platform) an intermediate representation of the application GUI is instantiated by the scaleable application. The intermediate representation is a device platform independent logic structure that may include at least one logical panel and representation of at least one graphical user interface (GUI) component in a hierarchical configuration. Nodes within the intermediate representation may include container nodes representing the logical panels and component nodes representing the graphical user interface components.

The intermediate representation may be dynamically customized by the customizing module based on the capabilities of the target device platform, as well as properties specified by application developers of the application GUI. Customization of intermediate representation converts the platform independent logic structure to a platform dependent logic structure.

A portion of the customization may be performed with the task manager module. The task manager module may selectively retain the logical panels and the graphical user interface components within the intermediate representation. Those logical panels and/or graphical user interface components suitable for the target device platform may be selected for retention in the intermediate representation.

The transformation manager module may perform another portion of the customization. The transformation manager module may dynamically configure the graphical user interface components and logical panels based on the hierarchy of the logic structure and constraints specified by the application GUI. The graphical user interface components and logical panels may be arranged on at least one page of a presentation as first part of the dynamic configuration. The presentation may be displayed on a display screen of the target device platform. In addition the transformation manager may also selectively transform the graphical user interface components to adjust the size of the page(s) and maximize the fill of the display screen as a second part of the dynamic configuration. Selective transformation of the graphical user interface components may include resizing the components and selecting alternative graphical user interface components based on transformation rules.

Following customization, the render manager module may traverse the customized intermediate representation to produce the application GUI on the display screen of the target device platform. The graphical user interface components and the logical panels may be extracted from the logic structure to create the application GUI.

The application GUI has been adapted to operate on the user interface of one of the heterogeneous device platform. As such, the device platform independent application GUI has been dynamically transformed into a device platform dependent application GUI by the SGUI architecture.

An interesting feature of the SGUI architecture involves the transformation manager module. The transformation manager module may generate a set of proposed device platform dependent pages. At least one of the device platform dependent pages may be selected to display the application GUI. Selection may be based on identifying the page(s) that provide the most desirable display on the display screen.

Another interesting feature is the use of transformation rules by the transformation module. The transformation rules may be selectively applied to GUI components to generate a list of possible GUI components. The transformation module may then select one of the GUI components from the list to interchange with the GUI component currently represented by a component node in the intermediate representation.

Other features and advantages of the invention will be apparent from the drawings and the more detailed description of the invention that follows. The foregoing discussion of the presently preferred embodiments has been provided only by way of introduction. Nothing in this section should be taken as a limitation on the following claims, which define the scope of the invention.

DETAILED DESCRIPTION OF THE PREFERRED EMBODIMENTS OF THE INVENTION

Figure 1:
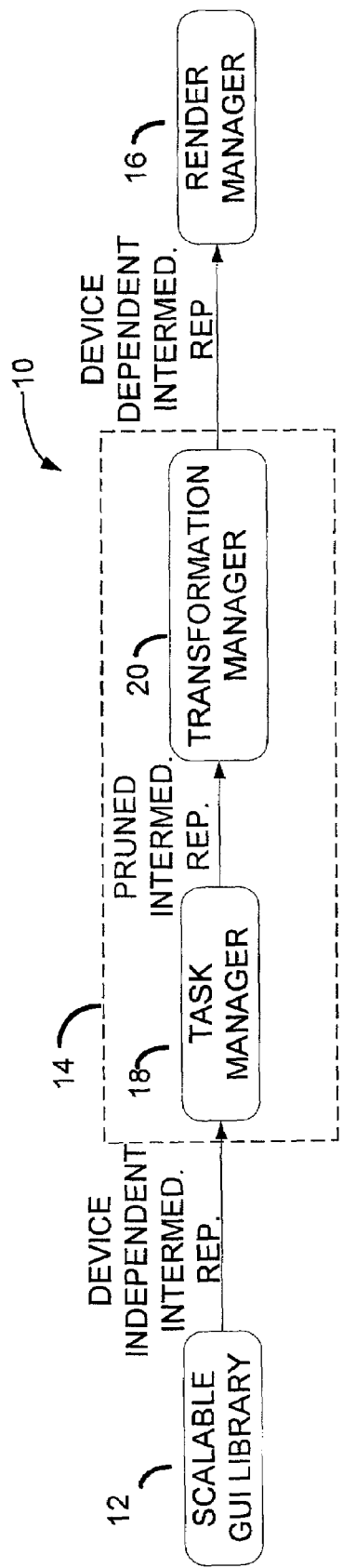
FIG. 1 is a block diagram of an embodiment of a scalable graphical user interface architecture.

The presently preferred embodiments describe a scalable graphical user interface architecture (SGUI) for use with scalable applications capable of operating on any of a plurality of different heterogeneous device platforms. The scalable applications may be dynamically adapted by the SGUI architecture to operate with a variety of user interfaces associated with the different heterogeneous device platforms. The SGUI architecture allows the scaleable applications to be designed with user interface capabilities that are independent of the different heterogeneous device platforms on which the scalable application may be run. Use of the SGUI architecture by application developers of scaleable applications may avoid many coding complexities otherwise experienced with scaling to different user interfaces associated with different heterogeneous device platforms. In addition, the SGUI architecture operates with different heterogeneous device platforms without the construction of models as in the model-based techniques. As such, programming by application developers is relatively less sophisticated, and model building and/or model manipulation expertise is unnecessary.

Scalable applications include any applications capable of operating on different heterogeneous device platforms. Many scalable applications include the capability to generate a presentation for a display screen of one of the heterogeneous device platforms. Presentations may include one or more pages (or presentation units) of visual material. The visual material may be arranged on the display screen for user of the heterogeneous device platforms. Scalable applications may generate presentations with application GUIs. Application GUIs are the graphical user interface component of the scalable application.

The different heterogeneous device platforms may be any device that includes a display screen and the capability to run a scalable application. Exemplary heterogeneous device platforms include wireless phones, pocket personal computers (PCs), personal device assistants (PDAs), pagers, desktop computers, notebook computers, on board vehicle computers or any other wireline/wireless device with a display screen that is capable of executing a scalable application. The heterogeneous device platforms may include an operating system such as, for example, Window NT™, Windows 2000™, Linux™, Solaris™, MacOS™, Palm™, Windows CE™, proprietary operating systems or any other operating system providing functionality to the device. The operating systems may provide capability to launch and support scaleable applications.

The heterogeneous device platforms may also include any other hardware and software to provide functionality as well as operate the scaleable application. For example, the heterogeneous device platforms may include a storage mechanism such as, for example, a memory. The storage mechanism may store, for example, the operating system, scaleable applications and any other information pertaining to the device platform. In addition, the heterogeneous device platforms may include a user interface. The user interface may include, for example, a device display, a key board, a pointing device similar to a mouse, a touch screen, a keypad, audio capabilities or any other mechanism providing an interface for a user of one of the heterogeneous device platforms.

The capabilities of the heterogeneous device platforms may vary widely. As used herein, "capabilities" include those hardware features and device functionality that may impact operation of scaleable applications as well as the operation of each of the heterogeneous device platforms. Capabilities of heterogeneous device platforms may include, for example, the type of device platform (e.g. wireless phone, PDA, laptop PC, etc.), the available user interfaces library, the size of the display screen and the resolution of the display screen. Further exemplary capabilities include user interfaces related to the display screen, the amount of computing power, the size of the memory, uses of the platform or any other parameters affecting the user interface and operation of a device platform.

In the presently preferred embodiments, the heterogeneous device platforms are mobile devices executing scalable applications created with Java technology. Java technology includes a Java programming language operating on a Java Virtual Machine (Java VM). The Java VM may be ported on to various device platforms. Exemplary implementations of Java technology includes Java VM operating on a notebook PC device platform, Personal Java VM on a pocket PC device platform and Java KVM operating on a wireless phone device platform. In other embodiments, other device platforms, as well as other programming languages/technologies, may be used with the SGUI architecture. Other programming languages/technologies include, for example, C, C++, Microsoft™ C sharp (C##) and/or any other technologies.

The SGUI architecture enables scalable applications to instantiate an intermediate representation of an application GUI associated with the scalable applications. The application GUI as well as the intermediate representation are preferably non-device specific (e.g. device platform independent), but compatible with the heterogeneous device platforms. Creation of an instance of the intermediate representation may be based on the application GUI of a scalable application. The intermediate representation may provide a logic structure for presentations generated by scalable applications. The logic structure may be customized for any of the different heterogeneous device platforms by the SGUI architecture. Customization may be based on properties specified in the application GUI as well as the capabilities of one of the heterogeneous device platforms targeted to display the presentation. More specifically, customization by the SGUI architecture addresses three issues common to graphical user interface development for heterogeneous device platforms, namely, display size, input methods and user interface libraries.

Display Size—A scalable application is typically capable of operation on many different heterogeneous device platforms. As such, application programmers developing scalable applications may not assume any specific size for the display screen. For example, a DOCOMO 503i wireless phone may include a 120×130 pixels display screen, a COMPAQ IPAQ Pocket PC may include a 320×240 pixels display screen, and a typical Notebook personal computer may include a 1024×768 pixels display screen. The display screen size may impact the quality of visual presentation as well as the layout of components forming pages of the presentation on the display screen.

The components forming the pages may be referred to as graphical user interface (GUI) components. GUI components are displayed features of the presentation that may be fixed, animated and/or interactive in the context of a display screen. Exemplary GUI components include, graphical labels, graphical buttons, graphical check boxes, graphical text fields, graphical texts areas, graphical lists/tables, graphical backgrounds, data entry fields, pull down menus and/or any other features capable of display on a display screen. GUI components may be stored in a GUI library with a unique identifier. The identifier allows applications, such as, for example, the previously discussed application GUIs to build a presentation with GUI components.

Presentations may be subdivided into pages as a function of the size of the display screen. A relatively large display screen, such as, for example, the display screen of a notebook PC, may be capable of accommodating larger pages with larger size and/or larger quantities of GUI components. On the other hand, a small display screen, such as, for example, on a wireless phone, may only accommodate relatively small pages with highly compact GUI components. In addition, the smaller pages may allow fewer GUI components to be displayed at the same time on the display screen.

The SGUI architecture may be utilized to maximize the fill of the display screen of heterogeneous device platforms. Utilizing the intermediate representation, the SGUI architecture may provide dynamic layout and graphical user interface (GUI) transformation of the application GUIs. As such, the application GUIs may be scaled to the display screen of one of the heterogeneous device platforms on which the scalable application is currently operating.

Input Methods—Different heterogeneous device platforms may also include different input methods associated with the scalable application and the application GUIs. For example, a wireless phone may use a keypad as an input method, a Pocket PC may uses a stylus as an input method and a Notebook PC may use a keyboard and/or a mouse-like pointing device as an input method. Accordingly, application developers developing scalable applications may not assume specific input methods for associated application GUIs.

The SGUI architecture provides device platform independent GUI events that are scalable to the different heterogeneous device platforms. GUI events are changes of state within the visual material on a page. Interaction by a user with the user interface (UI) of one of the heterogeneous device platforms may result in a GUI specific GUI events to device platform independent GUI events. As such, scaleable applications utilizing the SGUI architecture may be designed with GUI event functionality compatible with, but independent of, the user interface of the different heterogeneous device platforms.

User Interface Libraries—Heterogeneous device platforms may also support different application program interfaces (APIs). An API is one of a collection of ready-made software components providing a wide range of functionality. For example, Java technology includes Java Application Programming Interface (APIs). Java APIs are a collection of software components providing "off the shelf" capability that may be implemented within Java based programs.

The Java platform claims to be write once, run anywhere (WORA), however, this may not be true for Java applications developed in the mobile device environment. In a wireless telephone, for example, the Java programming language may be Java 2 micro edition (J2ME). In general, the design of J2ME is based on flexibility and fragmentation. To achieve flexibility, J2ME defines device platform-specific APIs. The device platform specific APIs are referred to as a profile. The different profiles result in fragmentation since J2ME applications may be written to run only on a particular device platform. For example, a DoCoMo 503i wireless phone may support a profile of Java referred to as J2ME DoJa APIs. Similarly, a Pocket PC may support the Personal Java AWT APIs and a Notebook PC may support Java 2 standard edition (J2SE) SWING APIs.

The APIs may support different GUI libraries depending on the heterogeneous device platforms. For example, a PDA may include more touch screen related GUI components in a corresponding GUI library. On the other hand, a wireless phone, for example, may include only indication related GUI components in a corresponding GUI library. As known in the art, GUI libraries are compilations of pre-developed GUI components that may be accessed to produce a presentation.

The SGUI architecture of one embodiment provides device platform independent APIs compatible with, and supported on, different heterogeneous device platforms. The device platform independent APIs provide a bridging function to the different GUI libraries associated with different heterogeneous device platforms. Accordingly, application developers utilizing the SGUI architecture need not be intimately familiar with different GUI libraries to develop a platform-specific GUI presentation for each of the heterogeneous device platforms.

An exemplary operation of the SGUI architecture is during the migration of a scalable application from one device platform to another device platform. Migration of a scalable application involves moving an instance of an operating scalable application from a source device platform to a target device platform. For example, consider a user operating a scalable application relating to email on a laptop PC in an office using a mouse/keyboard. Prior to the completing work, the user needs to leave the office. At this time, the user may migrate the still active scalable application from the laptop PC (source device platform) to a PDA (target device platform) and continue to perform email functions. Since the display screen of the laptop PC is much larger, the presentation of the application is scaled to the display screen of the PDA by the SGUI architecture. In addition, the user interface functionality achieved with the mouse/keyboard on the laptop PC may be scaled to the user interface functionality of a touch screen present on the PDA by the SGUI architecture. The SGUI architecture provides scalable application transferability of the user interface independent of the source and target device platforms. As such, the scalable application need only be designed to run using the SGUI architecture, not specifically designed to run on either of the two device platforms.

FIG. 1 is a block diagram of one embodiment of a scalable graphical user interface (SGUI) architecture 10. The SGUI architecture 10 includes a scalable GUI library module 12, a customizing module 14, and a render manager module 16 communicatively coupled as illustrated. The blocks identified in the illustrated embodiment are intended as illustrative designations to aid in understanding of the invention. These identifications are not intended to represent discrete structures. As such, fewer or additional blocks may be utilized in various embodiments to describe the functionality of the SGUI architecture 10.

The scalable GUI library module 12 may be a tool used by application developers during development of a scaleable application. In addition, the scalable GUI library module 12 may provide a library of GUI components for use with the intermediate representation by the SGUI architecture 10. In one embodiment, the device platform independent APIs may be utilized during development of scalable applications. The device platform independent APIs may be implemented by application developers within device platform independent application GUIs to build the intermediate representation. Accordingly, instantiation of an intermediate representation with device platform independent application GUIs includes execution of the device platform independent APIs within the scalable GUI library module 12. The instantiation of the intermediate representation is depicted as "Device Independent Intermed. Rep." in FIG. 1 to illustrate that the intermediate representation is device platform independent.

In general, operation of the scalable GUI library module 12 is similar to other forms of GUI libraries, such as, for example, Java abstract window toolkit (AWT). In the presently preferred embodiments, the scalable GUI library module 12 is designed to align with the look and feel commonly found in Java GUI applications. Accordingly, the effort required by application programmers familiar with Java technology to convert existing device platform specific application GUIs utilizing device platform specific APIs into device platform independent application GUIs utilizing the device platform independent APIs within the SGUI architecture 10 is minimized.

The customizing module 14 operates to customize the device independent intermediate representation for a target device platform. The term "target device platform" identifies one of the heterogeneous device platforms where the scaleable application is generating a presentation for display. Generation of a presentation may occur while a scaleable application is running on a device platform identified as the target device platform. In addition, a presentation may be generated when a scaleable application is migrated from a source to the device platform that is the target of the migration (the target device platform). The customizing module 14 of one embodiment includes a task manager module 18 and a transformation manager module 20 communicatively coupled as illustrated.

The task manager module 18 of one embodiment may operate to remove tasks (functions) from the device independent intermediate representation based on the capabilities of a target device platform. The intermediate representation is depicted as "Pruned Intermed. Rep." in FIG. 1 to illustrate the removal of tasks by the task manager module 18. In one embodiment, the scalable application identifies the capabilities of a target device platform and provides the capabilities to the task manager module 18. In another embodiment, the task manager module 18 is capable of identifying the capabilities of a target device platform.

Tasks removed from the intermediate representation may include those tasks representative of functions/capabilities of a scaleable application that are not suitable for a target device platform. For example, a laptop PC does not typically utilize tasks related to telephone keypad functionality. Similarly, it may not be desirable to display all tasks on a target device platform due to constraints of the available capabilities. For example, use of a wireless telephone keypad to input large amounts of text is troublesome and time consuming. As such, the task manager module 18 may remove many of the tasks related to editing functions that are too cumbersome for a wireless telephone. In one embodiment, the task manager removes the tasks according to the capabilities of the target device platform and/or any other properties specified by application developers within the intermediate representation.

The transformation manager module 20 operates to transform the intermediate representation into a device platform dependent presentation. The device platform dependent presentation may be adapted to the particular user interface present within the target device platform. Transformation of the intermediate representation preferably occurs following removal of unsuitable tasks by the task manager module 18. Transformation of the intermediate representation involves dynamically configuring the intermediate representation based capabilities of the target device platform, the logic structure of the intermediate representation and/or properties specified by the application GUI. Following transformation by the transformation manager module 20, the intermediate representation is a platform device dependent intermediate representation depicted in FIG. 1 as "Device Dependent Intermed. Rep." to illustrate customization to a particular one of the heterogeneous device platforms (a target device platform).

The render manager module 16 may operate to bring presentations onto the display screen of the target device platform. The render manager module 16 preferable operates following customization of the intermediate representation by the customizing module 14. The render manager module 16 may extract the presentation from the device platform dependent intermediate representation. In addition, the render manager 16 may utilize the scalable GUI library module 12 to display the presentation on a display screen of the target device platform.

Operation of the render manager module 16 includes traversing the device platform dependent intermediate representation to extract the presentation. The device platform dependent intermediate representation is actually an encoded representation of the application GUI customized to be device platform dependent for the target device platform. As such, display of the presentation extracted by the rendering manager module 16 is a display of a device dependent application GUI on the display screen of a target device platform.

The presently preferred embodiments of the SGUI architecture 10 may operate in conjunction with a scaleable application to provide seamless scaling of application GUIs to the capabilities of a target device platform. Application developers may use the scalable GUI library 12 as a tool to build the device platform independent intermediate representation from an application GUI. As illustrated in FIG. 1, during runtime of the SGUI architecture 10, an application GUI may be executed to instantiate the device platform independent intermediate representation using the scalable GUI library module 12. The customizing module 14 may customize the intermediate representation to the device dependent intermediate representation based on the target device platform the scaleable application is currently operating on. The rendering manager module 16 may utilize the device dependent intermediate representation to extract the presentation that has been customized to the user interface of the target device platform. The presentation may then be displayed on the display screen of the target device platform by the rendering manager module 16.

A more detailed discussion of the functionality of the modules illustrated in FIG. 1 will now be presented.

Figure 2:
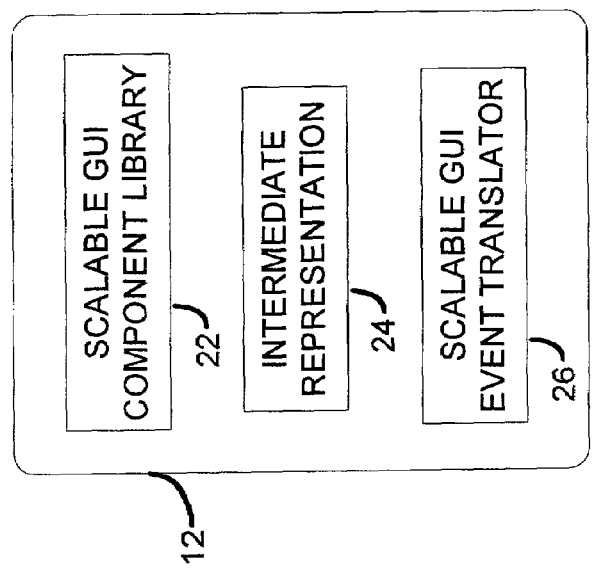
FIG. 2 is a more detailed block diagram of a portion of the scalable graphical user interface architecture depicted in FIG. 1.

FIG. 2 is a more detailed block diagram of one embodiment of the scalable GUI library module 12. The scalable GUI library module 12 of one embodiment includes a scalable GUI component library module 22, an intermediate representation (IR) module 24 and a scalable GUI event translator module 26. In other embodiments, fewer or more modules may represent the functionality of the scalable GUI library module 12. The scalable GUI component library module 22 may be similar in some respects to other well-known GUI component libraries. One embodiment of the scalable GUI component library module 22 includes a plurality of scalable graphic user interface (SGUI) components and the device platform independent APIs. As previously discussed, the device platform independent APIs are compatible with different heterogeneous device platforms, and are available for use in construction of device independent application GUIs.

The SGUI components are graphical user interface components within a library. The term "SGUI components" is used herein to illustrate that the graphical user interface components are device independent graphical user interface components supported by different heterogeneous device platforms operable with the SGUI architecture. Further, the term "SGUI components" is used to illustrate that the graphical user interface components may be customized for the different heterogeneous device platforms. SGUI components may also be referred to as composite SGUI components. As used herein, the term "composite SGUI components" refers to multiple SGUI components grouped to provide related functionality.

The device independent application GUIs may be used to create an instance of device independent intermediate representations that include a representation of the SGUI components. Prior to producing a presentation for display, however, the intermediate representations may be transformed (or customized) such that device platform dependent presentations may be displayed.

In the presently preferred embodiments, the scalable GUI component library 22 is similar in look and feel to Java SWING. This similarity may allow application developers familiar with Java SWING to learn the scalable GUI component library 22 relatively easily. In one embodiment, the similarity with Java Swing includes the existence of a prefix of each SGUI component. In this embodiment, however, the prefix is an "S" instead of a "J" as in Java SWING.

In general, there are four well-known techniques for building cross-platform GUI libraries, namely: Least Common Denominator (LCD), Superset Emulation, Direct API Emulation and Layering/Wrapper. The LCD technique can include features that are common to all GUI libraries. The Superset Emulation technique can provide a superset of GUI components for all GUI libraries. The Direct API Emulation technique can directly map a device-specific API of one GUI library to a device-specific API of another GUI library. The Layering/Wrapper technique can provide an abstract GUI library that maps to each GUI library.

In one embodiment of the SGUI architecture, a combination of both Direct API Emulation and Wrapper techniques are implemented. In other embodiments, any other technique or combination of techniques may be used. It should be noted, however, that use of the LCD technique may limit the availability of SGUI components. Further, use of the Superset Emulation technique may limit scalability when the number of GUI libraries supported by the SGUI architecture increases.

The combination of Direct API Emulation and Wrapper techniques may be implemented with the scalable GUI component library module 22. The scalable GUI component library module 22 may be mapped to any other GUI library. In one embodiment, the scalable GUI component library module 22 is mapped to device specific GUI libraries. The device specific libraries may include, for example, Java SWING, Java AWT and/or Java DoJa. In other embodiments, the scalable GUI component library module 22 may be mapped to additional/different libraries including non-device specific libraries.

Mapping within the scalable GUI component library module 22 preferably maps SGUI components to device-specific GUI components in other libraries. This mapping may occur where corresponding device-specific GUI components are available in the device-specific GUI libraries. If device-specific GUI components are unavailable, the SGUI components may be mapped to device-specific composite GUI components in the device-specific GUI libraries. In one embodiment, the mapping is not fixed. Accordingly, in this embodiment, application developers may override the default mapping by selectively changing/adding mapping of the SGUI components within the scalable GUI component library module 22.

Referring again to FIG. 2, the intermediate representation (IR) module 24 may be any application that includes the device independent APIs used by the application GUI to build an intermediate representation. The intermediate representation represents the device independent application GUIs utilizing the scalable GUI component library module 22. In the presently preferred embodiment, the intermediate representation has a tree-like structure and may be referred to as an intermediate representation (IR) tree. In other embodiments, other structures, such as, for example, an outline structure, a matrix structure or any other relational, logic based, structure may be used to represent the intermediate representation.

The IR tree provides a logic structure in which SGUI components may be arranged. The SGUI components may be arranged by encapsulating device platform independent application GUIs in a simple intermediate representation in the IR tree. Since the application GUIs are device platform independent, the IR tree may include every possible SGUI component supported by the scalable application. The SGUI components may be arranged to provide for relatively simple transformation to device platform dependent presentations. In addition, as later described in detail, layout structures, layout constraints and other properties indicating constraints may be specified within the logic structure of the IR tree. Further, the IR tree preferably mimics the hierarchal container concept of Java technology to perpetuate similarity with Java GUI application developments.

Figure 3:
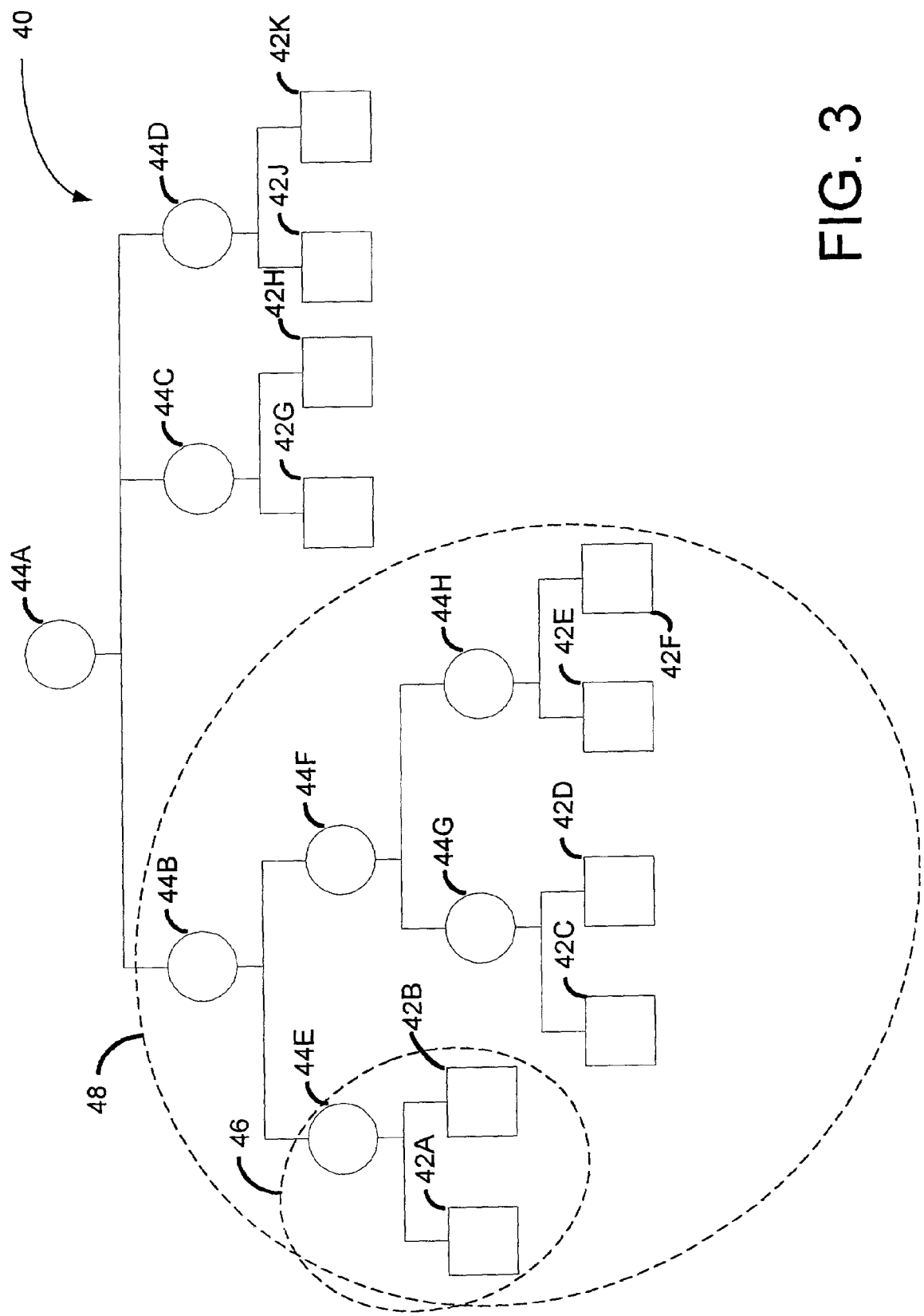
FIG. 3 is a block diagram of one example embodiment of an intermediate representation utilized by the scalable graphical user interface architecture of FIG. 1.

FIG. 3 is a block diagram illustrative example of the structure of an IR tree 40. The IR tree 40 comprises a plurality of interconnected nodes configured in a hierarchal structure. The illustrated hierarchal structure is just one example of any number of possible configurations. In the presently preferred embodiments, the IR tree 40 includes at least one component node 42 and at least one container node 44. In other embodiments, additional categories of nodes may be identified to represent application GUIs.

The component nodes 42 of one embodiment represent individual SGUI components. The component nodes 42 may be considered "leaves" of the IR tree 40 since there are no additional nodes of lower hierarchal position connected with the component nodes 42. The container nodes 44 of one embodiment represent logical panels within the IR tree 40. The logical panels are representative of different sections or panels within the pages of a presentation produced from the IR tree 40 for display on the display screen of a device platform. For example, within a scalable application related to email, a container node 44 may represent a window for displaying all the emails received by a user.

The container nodes 44 may have component nodes 42 and/or other container nodes 44 of lower hierarchal position connected with the container nodes 44 as illustrated. The nodes within lower hierarchical levels of the IR tree 40 represent related sub-logical panels and related SGUI components that are part of the section or panel represented by higher-level related logical panels. For example, in the window for displaying emails, a lower hierarchal level container node 44 may provide a descriptive header within the window and connected component nodes 42 may provide sorting functions for emails received.

In the exemplary IR tree 40e illustrated in FIG. 3, root container node 44a, is in the highest hierarchal level of the IR tree 40 and may represent an entire presentation. The remaining container nodes 44 may be considered hierarchal children of root container node 44a since they represent different logical panels within the presentation. Container nodes 44c, 44d, 44e, 44g and 44h may represent the lowest level container nodes of root container node 44a. Conversely, container nodes 44b, 44c and 44d are immediate hierarchal children of root container node 44a. As further illustrated, the hierarchal children of some of the container nodes 44 are the component nodes 42. For example, the hierarchical children of container nodes 44c and 44d are component nodes 42g, 42h and component nodes 42j, 42k, respectively.

The IR tree 40 may also represent a task structure of a scalable application. The task structure may be represented by grouping SGUI components related to each task performed by the scalable application. As used herein, the term "task" identifies functions that a user of a device platform may perform with the scalable application. Functions are dependent on the device platform as well as the scalable application. For example, email capability (scalable application) on a wireless phone device (device platform) may include such tasks as viewing, deleting and creating email messages utilizing a touch screen. Accordingly, groups of SGUI components for indication and acceptance of user commands may be grouped for each function.

The task structure preferable groups SGUI components (component nodes 42) related to a specific task (function) into a logical panel (container node 44). Grouping within a container node 44 may result in the display of a task represented by the corresponding group of SGUI components on a device display of the device platform. For example, as illustrated in FIG. 3, a task 46 may include container node 44e and hierarchical children component nodes 42a and 42b. Alternatively, a task may include multiple container nodes 44 and corresponding component nodes 42.

In one embodiment, the grouping of SGUI components also allows an application GUI to specify properties to provide constraints indicating task preferences. The properties may attach certain task preferences to the corresponding container nodes 44. Task preferences may, for example, specify tasks suitable for a particular device platform, specify alternative presentations of tasks on different device platforms and/or specify any other information related to a task and/or the device platform on which the scalable application is currently operating.

As previously discussed, application developers may construct the IR tree 40 within scaleable applications during development. In addition to specifying the hierarchical structure of the container nodes and the component nodes, application developers may also specify other properties providing constraints to influence the logic structure and/or layout parameters of the IR tree 40. The properties may be specified for the component nodes 42 (SGUI components), the container nodes 44 (logical panels) and/or the IR tree 40.

Creation of the instance of the IR tree 40 may include, or may occur based on, the properties specified. In the presently preferred embodiments, the specification of such properties may occur within application GUIs. In other embodiments, specification of the properties may occur elsewhere in scaleable applications, within the target device platform or within any other related device or application.

The IR tree 40 may also represent a layout structure of an application GUI within the page(s) (presentation unit(s)) of a presentation. In one embodiment, the interconnection patterns within the IR tree 40 allow a layout structure to be specified for higher-level related logical panels by immediate hierarchical children nodes. Application developers may specify properties indicating the layout structure for both component nodes 42 and container nodes 44 with the application GUI. The properties may specify the positioning of SGUI components (component nodes 42) or logical panels (container nodes 44) that are hierarchical children of a container node 44. For example, a layout structure in component node 42*a* may specify placement of the represented SGUI component in the upper right hand corner of the logical panel represented by container node 44*e*. Similarly, component node 42*b* may include a layout structure describing placement of the corresponding SGUI component in the upper left hand corner of the logical panel represented by container node 44*e*. Container node 44*e* may similarly include a layout structure specifying placement of the corresponding logical panel in the center of the logical panel represented by container node 44*b*.

As further illustrated in the example IR tree 40 of FIG. 3, a page 48 of the presentation may be formed from a hierarchically related group of container nodes 44 and component nodes 42. In the illustrated example, the page 48 is formed with container node 44*b*. The page 48 may result from the layout structure imposed by the related hierarchical levels below container node 44*b*. Specifically, properties specifying that the layout structure of component nodes 42*a*, 42*b*, 42*c*, 42*d*, 42*e*, 42*f* be within the corresponding container nodes 44*e*, 44*g* and 44*h*, as well as specification that container nodes 44*g*, 44*h* be within 44*f*, and container nodes 44*e* and 44*f* be within 44*b* may produce the page 46. In other embodiments, other hierarchical configurations of the nodes in the IR tree 40 in combination with specification of other layout structures may result in formation of pages.

The SGUI architecture may attempt to comply with the suggested layout structure when the pages of the presentation for the target device platform are created. In one embodiment, compliance with the suggested layout structure may be ignored where higher priority considerations must be implemented, such as, for example, maximizing utilization of the display screen of the target device platform.

Due to the device platform independent nature of the IR tree 40, however, variability of capabilities within different heterogeneous device platforms makes specification of such a layout structure difficult at the time an application GUI is developed. For example, the maximum allowable size of a page is dependent on the size of the display screen of a target device platform and therefore is unknown at development time. In addition, the actual size of any SGUI component is unknown at development time. The actual size is unknown, since an SGUI component may be transformed into one of many possible SGUI components of various sizes based on the capabilities of the target device platform.

In one embodiment, application developers may make a reasonable estimate of the size of an SGUI component relative to adjacently placed SGUI components within the presentation. If the estimate is accurate (close to the size of the SGUI component following transformation), large "holes" between SGUI components in the layout within the display screen of a target device platform may be avoided. In another embodiment, the SGUI architecture attempts to preserve the relative sizes of the SGUI components within the same container node 44 (logical panel) to avoid "holes." In still other embodiments, variability of the layout structure may be addressed by some form of automatic layout generation, customization by application developers of the layout for each target device platform and/or any other technique to address variability in the size of the SGUI components.

In addition to specification of properties indicating task preferences and layout structures, application developers may also specify additional properties providing constraints to influence the logic structure and/or layout parameters of the IR tree 40. In one embodiment, properties pertaining to a layout priority for the container nodes 44 may be specified. The properties of this embodiment identify the order in which container nodes 44 may be placed on pages. A container node 44 with the highest layout priority may have SGUI components identified by corresponding component nodes 42 located on a first page within a display screen. For example, an application developer who wishes certain tasks to be easy for the user of a device platform to locate will place a high layout priority on the corresponding logical panel(s) (container node(s)) 44).

In other embodiments, properties identifying layout constraints may be included for the component nodes 42. The layout constraints may specify two or more SGUI components that must be placed adjacent to each other on the same page. For example a selectable button indicating "yes" and a selectable button indicating "no" may include layout constraints specifying that the buttons remain adjacent.

Similarly, in still other embodiments, properties may identify layout groups within the container nodes 44. The layout groups may specify if the nodes within a container node 44 may be placed on separate pages within a layout structure. In one embodiment, all container nodes 44 having component nodes 42 as immediate hierarchical children are not divisible unless specified otherwise by the layout groups. Similarly, all container nodes 44 of this embodiment that do not include component nodes 42 as immediate hierarchal children are divisible.

The properties in yet another embodiment include the ability to specify a label for the container nodes 44. The label may be associated with a logical panel and may create a navigation bar/menu within the presentation to move between pages. In other embodiments, the properties may be utilized to identify any other specifications, logic conditions and/or additional functionality related to the component nodes 42, the container nodes 44 and/or the IR tree 40.

Referring once again to FIG. 2, the scalable GUI event translator module 26 may be any technique for translating GUI events generated by the user interface of target device platforms. In one embodiment, the scalable GUI event translator module 26 includes device platform independent GUI event APIs. The device platform independent GUI event APIs process GUI events for the scaleable application. As previously discussed, a GUI event describes a change of state in an SGUI component on a display screen resulting from interaction with the user interface associated with the corresponding device platform.

In the prior art, GUI events are defined by device-specific GUI APIs. The device specific GUI APIs define the GUI events in a way that is closely tied to the device-specific input/output methods generating the GUI events. The scalable GUI event translator module 26 may be utilized to translate GUI events for heterogeneous device platforms. The scalable GUI event translator module 26 includes a device platform independent GUI event translator capable of operation with a plurality of different input methods.

In one embodiment, the GUI event translator defines an abstract event called an action. The action is independent of the input method. For example, an action associated with a GUI component operating as a button may be generated from a laptop PC mouse click, a Pocket PC stylus tap, or a cell phone soft key press depending on the device platform. Scalable applications may be provided the actions representing GUI events by the GUI event translator. As such, the input method generating a GUI event may remain transparent to the scalable application.

The scalable GUI event translator module 26 preferably includes a scalable user interface library of platform independent actions. The scalable user interface library may be included in the scalable GUI component library 22, or may be a different library. In one embodiment, the scalable GUI event translator module 26 may include logical mapping based on the device platform independent GUI event APIs. Application developers of scalable applications may utilize the device platform independent APIs for logical mapping between device platform-specific GUI events and equivalent platform independent actions. As such, platform-independent actions may be delivered to scalable applications as a result of corresponding device platform specific GUI events.

For some scalable applications, mapping between platform-specific GUI events and platform-independent actions may not be possible due to device platform constraints. For example, a scalable application may include an interactive map capable of zooming in or out when a user clicks on a specific point in the map image. On a PC, a device platform specific mouse event captures the specific location of the mouse click. A wireless phone, however, may not include a pointing input device as a user interface. As such, it may not be possible to map an equivalent platform independent action on the wireless phone. In this case, the library of the scalable GUI event translator module 26 may include device platform dependent actions for platform-specific input methods not otherwise represented by platform-independent actions. Accordingly, an application GUI may include properties to customize the GUI application for a target device platform with such constraints. In one embodiment, the device platform dependent actions may not be used to implement core features of a scalable application, since device platform-specific GUI events are generally not scalable. In this embodiment, the device platform dependent actions may be used as an optional enhancement to the core features.

Figure 4:
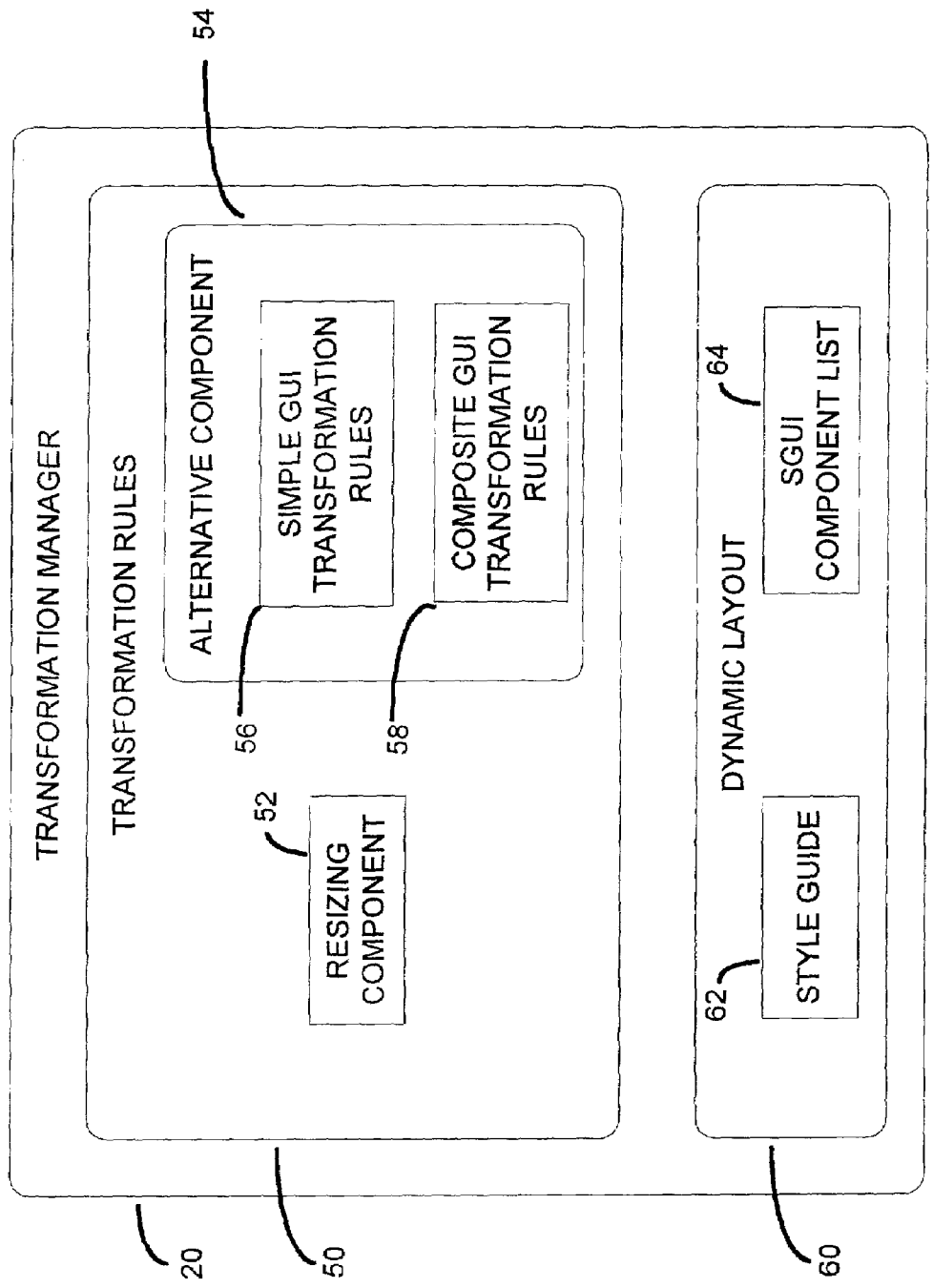
FIG. 4 is a more detailed block diagram of another portion of the scalable graphical user interface architecture depicted in FIG. 1.

FIG. 4 illustrates one embodiment of a more detailed block diagram of the transformation manager module 20. The transformation manager module 20 includes a transformation rules module 50, a resizing component module 52, an alternative component module 54, a simple GUI transformation rules module 56, a composite GUI transformation rules module 58, a dynamic layout module 60, a style guide module 62 and a SGUI component list module 64. In other embodiments, the functionality within the transformation manager module 20 may be represented with fewer or greater numbers of modules.

In general, the transformation manager module 50 may utilize the scalable GUI component library 22 (FIG. 2) to dynamically configure the IR tree. Dynamic configuration of the IR tree includes placing the SGUI components represented in the IR tree on a page(s) of the corresponding presentation as well as selectively transforming the SGUI components with transformation rules.

The transformation rules module 50 includes a plurality of transformation rules that may be utilized to transform the SGUI components represented in the IR tree 40 (FIG. 3). In one embodiment, the transformation rules module 50 includes the resizing component module 52 and the alternative component module 54 representing two general categories of transformation rules. The resizing component module 52 may provide rules to adjust the size of the SGUI components based on the size of the display screen of a target device platform. The alternative component module 54 may identify alternative SGUI components to replace those SGUI components representing the application GUI in the IR tree.

The alternative component module 54 of one embodiment includes the simple GUI transformation rules module 56 and the composite GUI transformation rules module 58 illustrating two categories of rules for alternative SGUI components. The simple GUI transformation rules module 56 provides rules to transform SGUI components into SGUI components specific to the target device platform.

Figure 5:
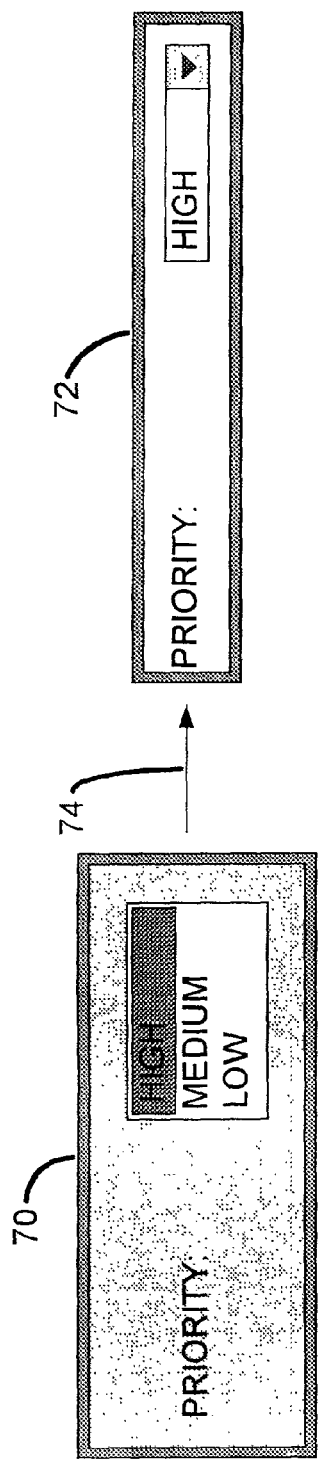
FIG. 5 is one embodiment of an exemplary transformation of a graphical user interface component using the scalable graphical user interface architecture depicted in FIG. 1.

FIG. 5 illustrates an example of transformation with a transformation rule from a first SGUI component 70 to a second SGUI component 72 that is specific to the target device platform. SGUI components may be identified as specific to the target device platform based on the capabilities of the target device platform, the type of target device platform, the user interface of the target device platform, the functionality of the scaleable application and/or any other parameters related to display of SGUI components.

In the illustrated example, the first SGUI component 70 represents a priority selection list in which "high," "medium," or "low" priority may be selected by a user. Similarly, the second SGUI component 72 represents a priority selection button. If, for example, the IR tree 40 (FIG. 3) included a component node 42 (FIG. 3) for the first SGUI component 70 and the target device platform was a PDA, the simple GUI transformation rules module 56 (FIG. 4) may provide a transformation rule to transform the first SGUI component 70 to the second SGUI component 72 as illustrated by arrow 74.

The second SGUI component 72 of this example may be identified as specific due to the limited size of the display screen of the PDA, the user interfaces available on the PDA, or any other reasons related to the PDA or the scaleable application. This illustrative example is one of an almost infinite number of transformation rules that may be applied to SGUI components.

Figure 6:
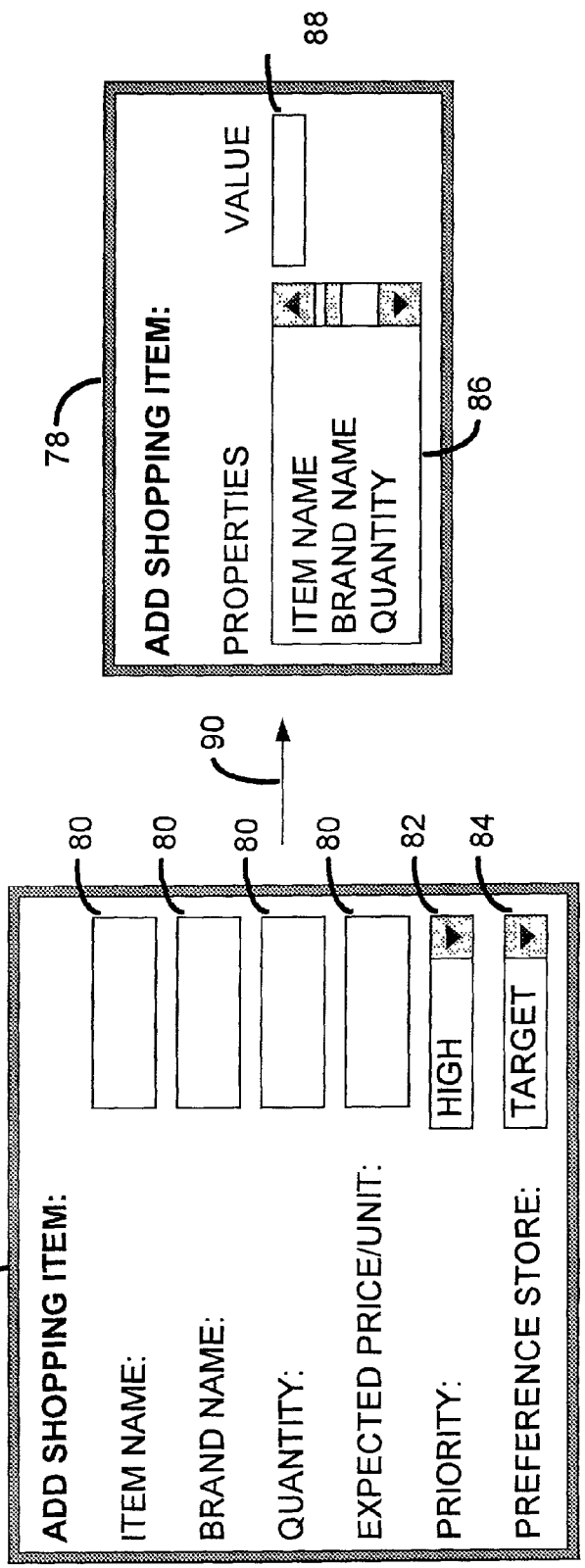
FIG. 6 is one embodiment of an exemplary transformation of a composite graphical user interface component using the scalable graphical user interface architecture depicted in FIG. 1.

Referring again to FIG. 4, the composite GUI transformation rules module 58 provides transformation rules to transform composite SGUI components into composite SGUI components specific to a target device platform. As previously discussed, composite SGUI components may be represented by container nodes 44 (FIG. 3) and corresponding components nodes 42 (FIG. 3) in the IR tree 40 (FIG. 3). FIG. 6 illustrates an example transformation of a first composite SGUI component 76 to a second composite SGUI component 78 that is specific to a target device platform.

In the illustrated example, the first composite SGUI component 76 represents a plurality of data entries 80, a priority selection 82 and a preference selection 84. The second composite SGUI component 78 includes a pick list 86 and a single data entry 88. Similar to the example discussed with reference to FIG. 5, a transformation rule available from the composite GUI transformation rules module 58 may be used to transform the first composite SGUI component 76 to the second composite SGUI component 78 as illustrated by arrow 90.

Referring once again to FIG. 4, the dynamic layout module 60 may dynamically configure the IR tree to represent a device platform dependent presentation. Dynamic configuration involves placing the SGUI components represented by the IR tree in a page(s) of a presentation and selectively transforming SGUI components. In one embodiment, the SGUI components represented by the IR tree may be placed onto pages according to the layout structure and other constraints specified by the application GUI. In addition, the dynamic layout module 60 may compare the presentation to the capabilities of the target device platform to confirm compatibility. For example, one capability related constraint may be the size of the page(s) of the presentation. The size of the page(s) configured by the dynamic layout module 60 should not exceed the size of the display screen of the target device platform that will display the presentation. Other exemplary capability related constraints may be a minimum viewable size of the SGUI components or any other capability related to a target device platform.

The dynamic layout module 60 may select and apply transformation rules available from the transformation rules module 50 to transform the SGUI components into compliance with the capabilities/constraints. For example, to meet the constraint of the size of the display screen, the dynamic layout module 60 may apply transformation rules to SGUI components in the IR tree to create a more compact presentation. Selection of the transformation rules may be a result of the scaleable application, the size of the display screen of the target device platform, the user interface capability of the device platform and/or any other parameters related to display and interaction with the target device platform.

In one embodiment, the dynamic layout module 60 may generate a page(s) for a presentation based on the capabilities/constraints. In another embodiment, the result of apply the transformation rules is the generation of a set of proposed pages of various configurations that are specific to the target device platform. Each of the proposed pages in the set is part of a possible device platform dependent presentation. Based on the proposed page(s) developed within each possible presentation, the dynamic layout module 60 may selectively utilize pages from within the set to obtain the most desirable device platform dependent presentation. Desirable features may include, for example, minimizing the number of pages, complying with properties specified by the application GUI, maximizing utilization of the display screen for each page, and/or any other characteristics associated with the presentation, the target device platform and/or the scaleable application.

As further illustrated in FIG. 4, the dynamic layout module 60 of this embodiment includes the style guide module 62 and the SGUI component list module 64. In other embodiments, additional or fewer modules may be identified within the dynamic layout module 60 to illustrate functionality.

The style guide module 62 may provide at least one set of style guide parameters for application to the SGUI components. The style guide parameters may standardize the visual appearance of the SGUI components to provide a consistent appearance within a presentation. Exemplary style guide parameters include font sizes, spacing between components, colors, etc. In one embodiment, a single set of style guide parameters is used for all device platforms. In another embodiment, sets of style guide parameters may be associated with one or more target device platforms.

The SGUI component list module 64 may compile a list of possible SGUI components. The list of possible SGUI components may represent SGUI components resulting from transformation of one of the SGUI components represented in the IR tree. The dynamic layout module 60 may apply transformation rules to each SGUI component represented in the IR tree to generate the list. In one embodiment, the list of SGUI components may be compiled by the SGUI component list module 64 according to the size of each SGUI component in the list.

The dynamic layout module 60 may selectively apply appropriate transformation rules from the transformation rules module 50 to generate the list of SGUI components. In one embodiment, a rule-based technique may be utilized by the dynamic layout module 60 for selection of appropriate transformation rules. The technique may involve selectively applying transformation rules based on two preconditions. The first precondition may involve consideration of characteristics of the SGUI component to be transformed. The second precondition may involve consideration of the capabilities of the target device platform targeted for the presentation.

In addition to the preconditions, in one embodiment, selection of appropriate transformation rules may also involve ranking by the dynamic layout module 60. Ranking of the transformation rules may be based on the results of applying each of the transformation rules. For example, ranking may be based on how likely a transformation rule is to produce a reasonable translation for different scaleable applications. Those transformation rules with greater success are ranked highly and those that are more specific to a particular scaleable application may be ranked lower. For example, the transformation of a selection list (with a small number of selectable items) to a choice button (see FIG. 5) may be universally applied in many scaleable applications; hence a high ranking may be assigned.

Following generation of the list of SGUI components, the dynamic layout module 60 may selectively choose SGUI components from the list for use in the presentation. In one embodiment, selection of the SGUI components is based on maximizing the fill of a display screen. In other embodiments, other conditions, such as for example, capabilities of the target device platform, the scaleable application and/or any other conditions may be used in the selection process. The SGUI components may be selected from the list and placed on page(s) representative of the presentation. The SGUI components selected from the list may replace the SGUI components used to generate the list. This interchange of SGUI components effectively transforms a device platform independent SGUI component into an SGUI component specific to the target device platform.

In one embodiment, each of the pages may be compared with the size of the display screen to maximize fill. In this embodiment, depending on whether reduction or enlargement of the SGUI components making up the page is needed, the dynamic layout module 60 may select larger or smaller size SGUI components from the list. In one embodiment, where there are a number of similarly sized SGUI components in the list corresponding to one of the SGUI components, the selection may be further based on the previously discussed ranking of the transformation rules used to create the SGUI components in the list.

In the presently preferred embodiments, the dynamic layout module 60 may iteratively proceed through the IR tree to create a page(s) associated with the presentation. In one embodiment, the iterative process by the dynamic layout module 60 proceeds from the lowest hierarchical levels of the IR tree toward the higher levels. The dynamic layout module 60 may iteratively add logical panels to a page of the presentation to fill the page. When a page is under filled, a hierarchically related logical panel from a sibling, or higher-level related node, may be added to the page. For example, referring to FIG. 3, container nodes 44h, 44f and 44e may be iteratively added to container node 44g to create the page 48. Conversely, when a page is overfilled, transformation of the SGUI components within the page may be performed to reduce the fill to comply with the size of a display screen.

When a page is substantially full, a new page of the presentation may be similarly produced. A "substantially full" page maximizes the fill of the display screen of the target device platform with the available SGUI components. In one embodiment, a page occupying between about 95%–100% of the display screen of a target device platform is substantially full. The layout structure, the other specified constraints and/or the SGUI components may prevent the display screen from being completely full; however, a substantially full page maximizes the fill under the present conditions.

Figure 7:
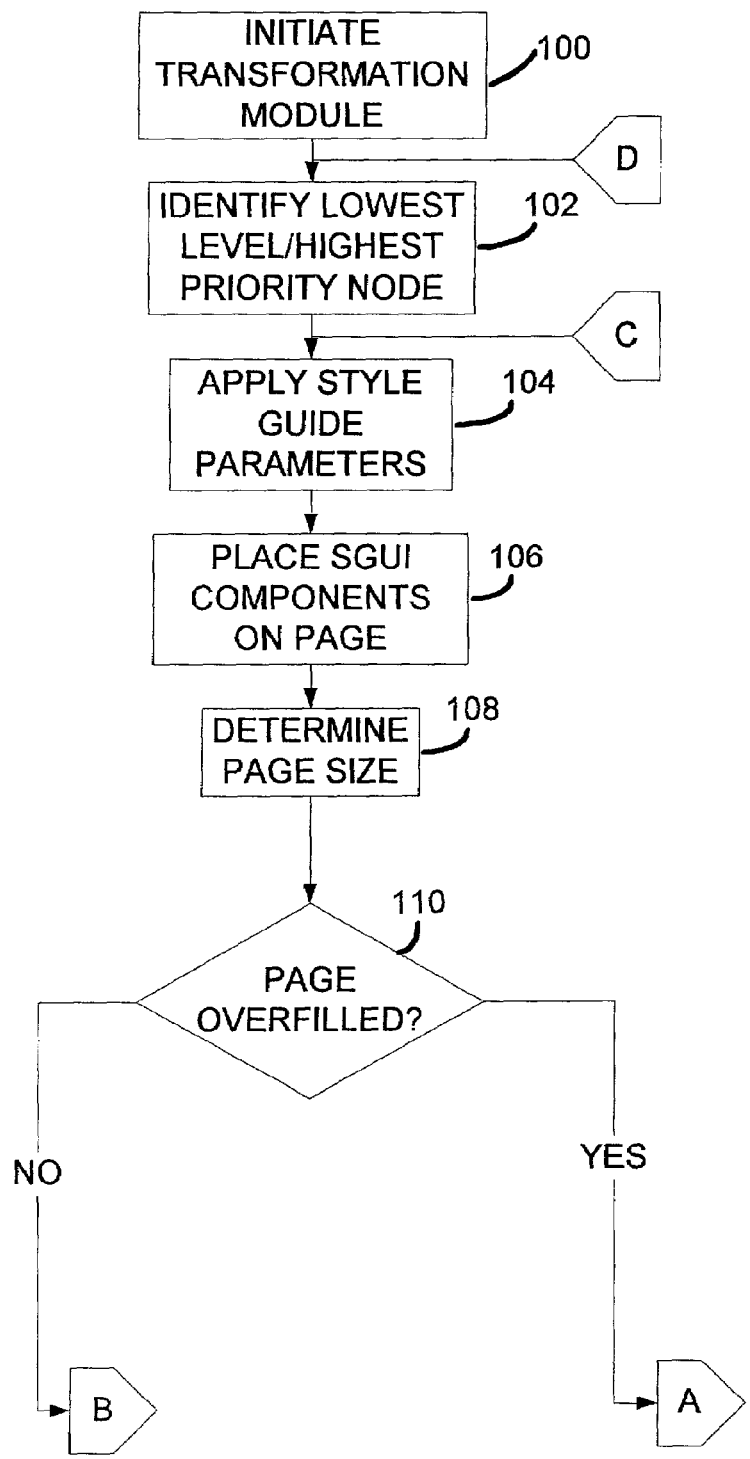
FIG. 7 is a flow diagram illustrating operation of one embodiment of the scalable graphical user interface architecture illustrated in FIG. 1.

FIG. 7 is a block diagram illustrating operation of one embodiment of the transformation module 20 illustrated in FIG. 4 with reference to the exemplary IR tree 40 illustrated in FIG. 3. Operation of the transformation module 20 is initiated at block 100. Initiation of the transformation module 20 preferably occurs following instantiation and pruning of the IR tree 40. At block 102, the lowest-level container node 44 with the highest layout priority in the IR tree 40 is identified. The lowest-level container node(s) are those with hierarchal children nodes representative of SGUI components (component nodes 42). In the exemplary IR tree 40 of FIG. 3, container nodes 44c, 44d, 44e, 44g and 44h are the lowest-level container nodes. The layout priority may be identified by properties of the application GUI. For purposes of illustrating operation, container node 44g of FIG. 3 has been identified as having the highest layout priority.

The style guide module 62 applies the set of style guide parameters corresponding to the target device platform to SGUI components (component nodes 42c and 42d) associated with the identified container node (container node 44g) at block 104. At block 106, the SGUI components are placed on a page of a presentation in accordance with the layout structure of the IR tree 40 and constraints specified by the application GUI. The size of the page is determined at block 108. At block 110, it is determined if the page is over filled. The page is over filled if the size of the page is bigger than the size of the device display of the target device platform.

Figure 8:
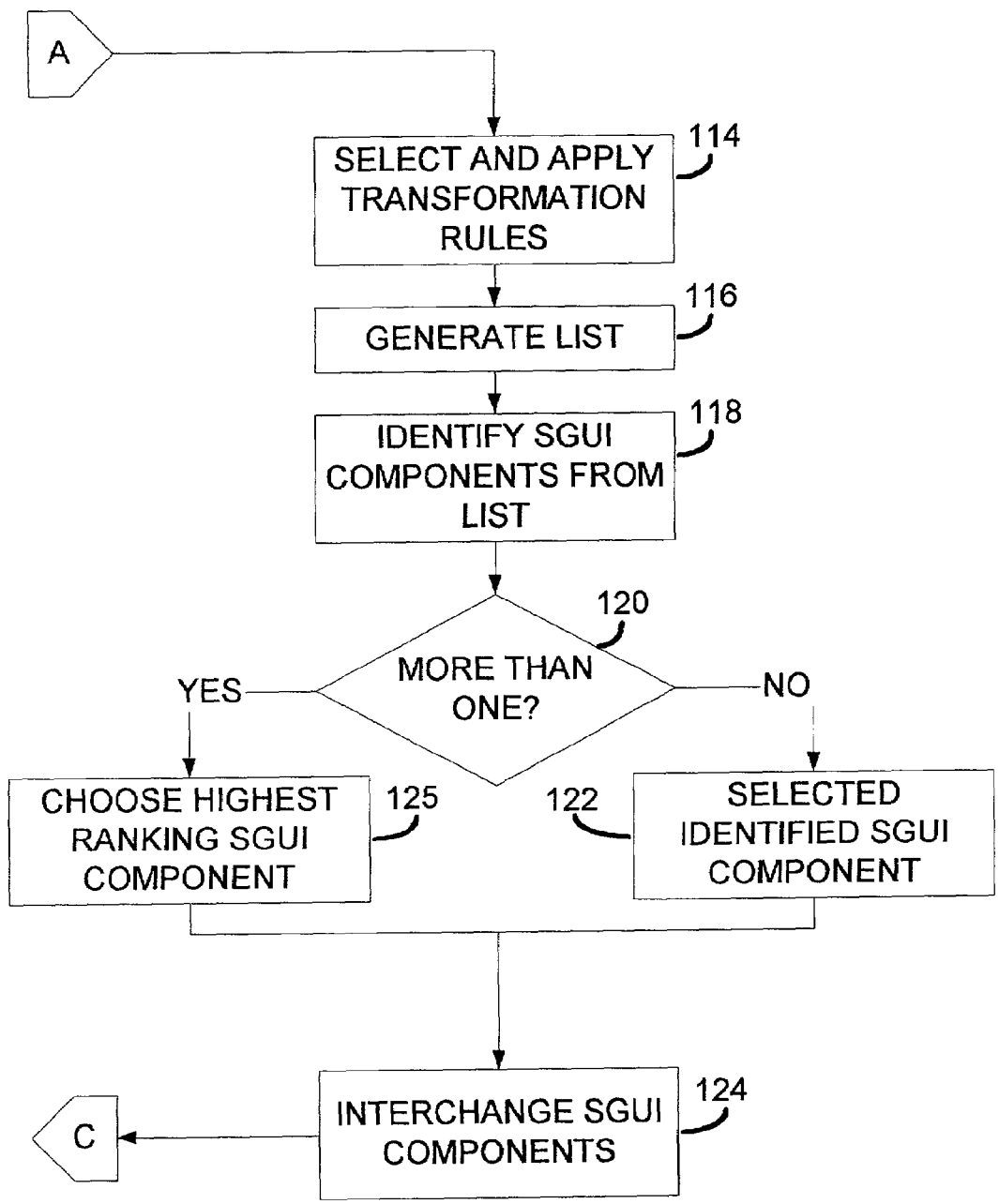
FIG. 8 is second portion of the flow diagram illustrated in FIG. 7.

Referring now to FIG. 8, if the page is over filled, at block 114, appropriate transformation rules are selected and applied to each of the SGUI components by the dynamic layout module 60. Lists of possible SGUI components are created and compiled according to size with the SGUI component list module 64 at block 116. At block 118, SGUI components are identified from the list based on conditions, such as for example, the amount of size reduction needed. At block 120, it is determined if more than one SGUI component in the list has been identified. If no, the identified SGUI component is selected at block 122. At block 124, the selected SGUI component is interchanged with the corresponding SGUI component previously represented in the page (at block 106), and the operation returns to block 104 (FIG. 7). If multiple SGUI components have been identified, the SGUI component created from the highest ranked transformation rule is selected at block 125 and the operation proceeds to block 124.

Figure 9:
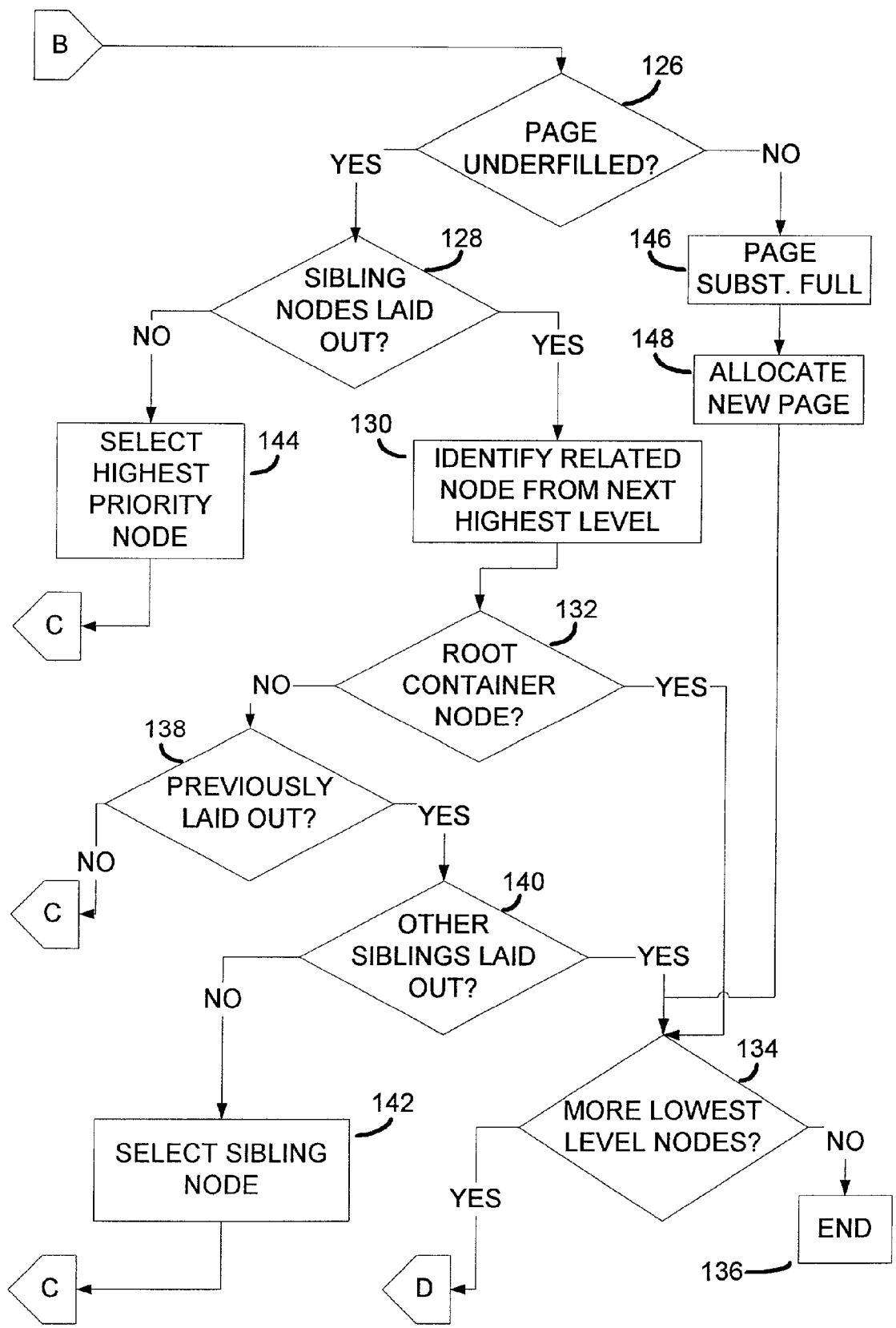
FIG. 9 is a third portion of the flow diagram illustrated in FIG. 7.

Referring now to FIG. 9, if the page is not over filled at block 110 (FIG. 7), determination of whether the page is under filled occurs at block 126. The page is under filled when the size of the page is smaller than the size of the display screen of the target device platform. If the page is determined to be under filled, identification of any sibling nodes (container node 44h of FIG. 3) not yet laid out on a page occurs at block 128. If such sibling nodes are not laid out, the identified sibling node of highest priority is selected at block 144 and the operation returns to block 104 (FIG. 7) to begin processing the selected node. If the sibling nodes are already laid out (or non-existent), a related node from the next highest hierarchal level (container node 44f of FIG. 3) is identified at block 130.

At block 132, the node from the next higher hierarchal level is checked to determine if it is the root container node (container node 44a in FIG. 3). If yes, the IR tree is checked for additional lowest level container nodes not already laid out on a page at block 134. If such additional lower level container nodes exist, the operation returns to block 102 (FIG. 7) to identify another container node 44 (FIG. 3) at the lowest level and the next highest priority. If additional lower level container nodes do not exist, the operation ends at block 136.

Returning now to block 132, if the node in the next higher hierarchal level (container node 44f of FIG. 3) is not the root container node (container node 44a of FIG. 3), it is determined if the node has been previously laid out in a page at block 138. If the node was not previously laid out, the operation returns to block 104 (FIG. 7) to begin processing the node. If the node was previously laid out, it is determined if sibling nodes (container node 44e of FIG. 3) of the node in the next higher hierarchical level have not been laid out at block 140. If the siblings nodes have already been laid out in a page (or do not exist), the operation returns to block 134. If sibling nodes have not yet been laid out, the sibling node with the highest layout priority is selected at block 142 and the operation returns to block 104 (FIG. 7) to begin processing the selected node.

Returning now to block 126, if the page is not under filled, the page is considered substantially full at block 146. At block 148, a new page is allocated for laying out the remaining SGUI components and the operation returns to block 134.

In another embodiment, upon determining the page is full, additional operations may be performed to generating additional variations of the same page with alternative SGUI components from the list. Following these additional operations, the dynamic layout module 60 may select the most desirable device platform dependent presentation as previously described.

Figure 10:
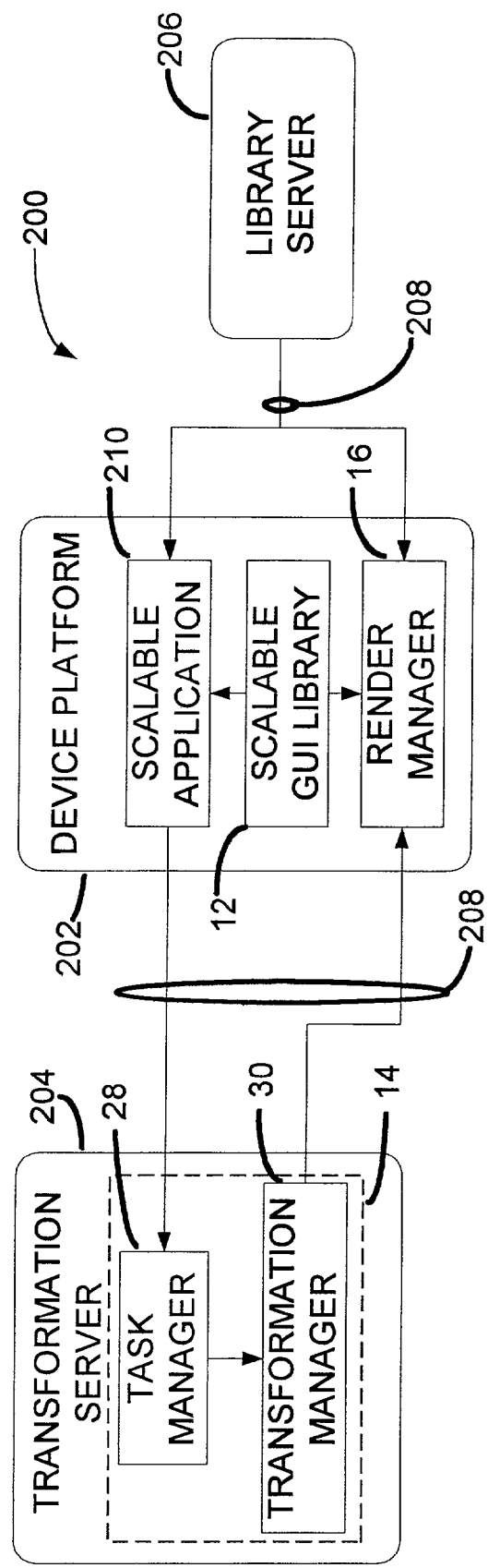
FIG. 10 is one embodiment of a communication system that includes devices operating with the scalable graphical user interface architecture depicted in FIG. 1.

An exemplary utilization of the SGUI architecture within a communication system will now be described. FIG. 10 is an exemplary embodiment of a communication system 200 that includes a device platform 202, a transformation server 204 and a library server 206 in operable communication over a network 208. The device platform 202 may be any of the previously described heterogeneous device platforms. The transformation server 204 and the library server 206 may be any device performing a server function within the network 208. In one embodiment, one or more server computers that include an operating system operate as the transformation server 204 and the library server 206. Exemplary operating systems include Microsoft™ Windows NT™, UNIX™ or any other operating system capable of supporting server functionality. The servers 204, 206 may include the ability to store and access data as well as execute applications, such as, for example, portions of the SGUI architecture. The network 208 may include the Internet, a public or private intranet, an extranet and/or any other form of network configuration to enable transfer of data and commands via wireless, fiber optic and/or wireline communications.

The SGUI architecture is operable within the communication system 200. In one embodiment, a scalable application 210 may be operated on the device platform 202. In addition, the scalable GUI library module 12 and the render manager module 16 may operate on the device platform 202. Further, in this embodiment, the task manager module 18 and the transformation manager module 20 may operate within the customizing module 14 on the transformation server 204. The scalable application 210, the scalable GUI library module 12, the customizing module 14 and the render manager module 16 operate similarly in this embodiment as in the previously discussed embodiments.

Different functionality within the SGUI architecture as well as the scalable application may be distributed among different device platforms and servers in other embodiments. For example, where sufficient capabilities exist to support such operation, the entire SGUI architecture and scalable application 210 may be operating on the device platform 202. In another example, portions of the SGUI architecture and the scalable application 210 may be operated on the device platform 202 and other portions of the SGUI architecture and the scalable application 210 may be operated on other device platforms. In yet another example, the majority of the SGUI architecture may operate on a server or other similar device and only the essential components of the SGUI architecture may operate on the device platform 202.

In one embodiment, the entire scalable GUI component library 22 (FIG. 2) within the scalable GUI library module 12 may be stored in the device platform 202. In this embodiment, the transformation server 204 may access the scalable GUI component library via the network 208. As previously discussed, the transformation manager 20 may access the scalable GUI component library during transformation of the SGUI components.

In another embodiment, a portion of the scalable GUI library module 12, along with a subset of the scalable GUI component library 22 may be stored in the device platform 202. Storage of the scalable GUI component library 22 may be limited to a subset because of; for example, limited storage capability of the device platform 202, gains in retrieval response and/or any other reasons related to operation of the device platform 202 and/or the scaleable application 210. The subset of the scalable GUI component library 22 may include SGUI components frequently used by the device platform 202. In this embodiment, a portion of the scalable GUI library 12 along with the entire scalable GUI component library 22 (FIG. 2) may be stored on the library server 206 and accessed over the network 208 by the device platform 202 as needed. The customizing module 14 may also access either the subset of the scalable GUI component library 22 in the device platform 202 and/or the entire scalable GUI component library 22 in the library server 206. In another embodiment, the transformation server 204 may store the entire scalable GUI component library 22 for access by the device platform 202, as well as the transformation server 204.

In yet another embodiment, the transformation server 204 may include a portion of the scalable GUI library 12. Portions of the scalable GUI library 12 may be included in the transformation server 204 due to, for example, limited computing power in the device platform 202, the desire to conserve the resources of the device platform 202 or any other reasons related to operability of the SGUI architecture. In one embodiment, a portion of the intermediate representation module 24 (FIG. 2) may be included in the transformation server 204. The portion of the intermediate representation module included in the transformation server 204 may operate to create an instance of the IR tree based on mobile code. In this embodiment, mobile code may be transmitted from the application GUI of the scaleable application 210 over the network 208 to the transformation server 204. The portion of the intermediate representation module may execute the mobile code to create an instance of an IR tree representative of the application GUI.

Figure 11:
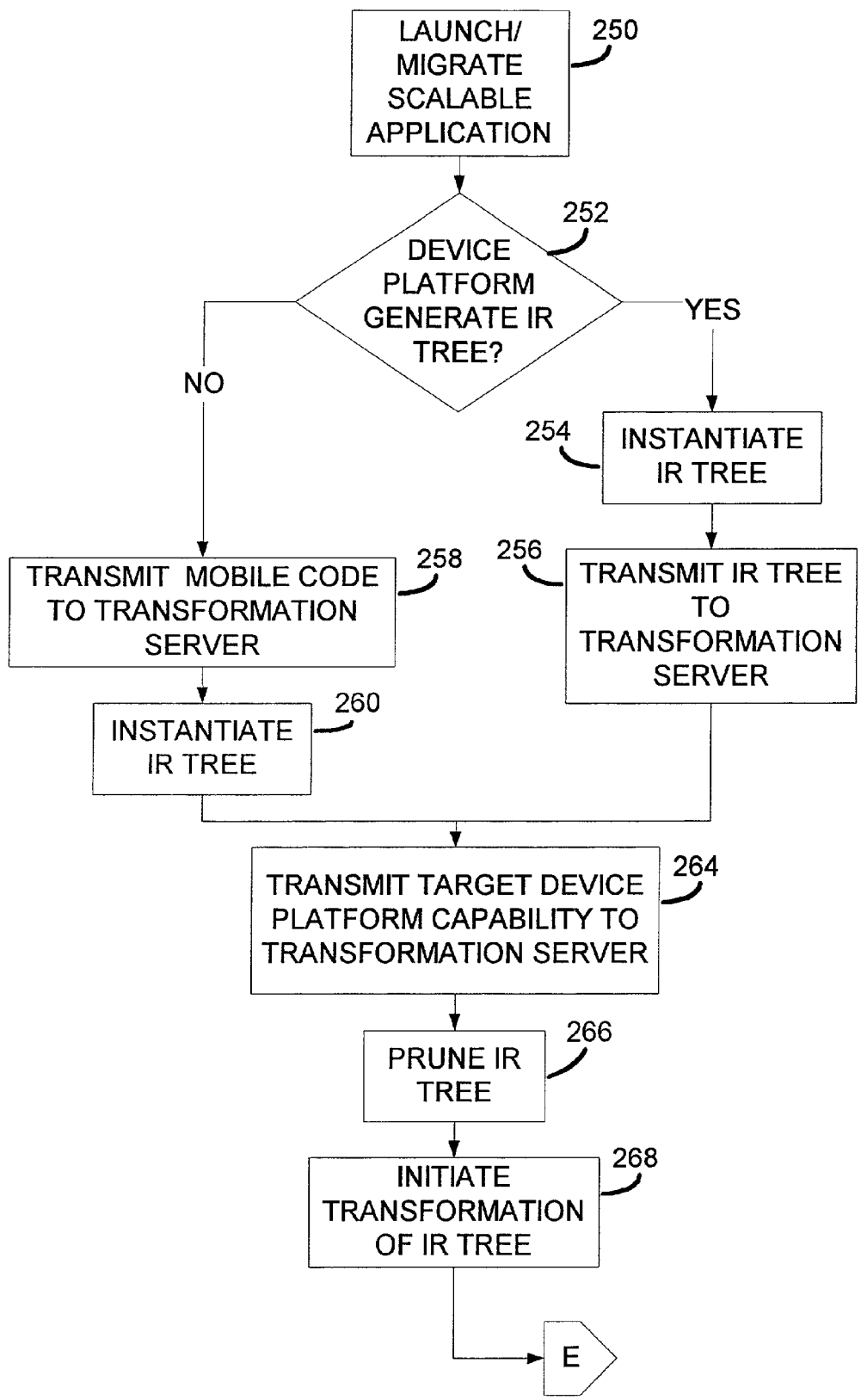
FIG. 11 is a flow diagram illustrating operation of the scalable graphical user interface architecture within the communication system illustrated in FIG. 10.

FIG. 11 is a block diagram illustrating operation of one embodiment of the SGUI architecture discussed with reference to FIG. 10. Operation begins at block 250 when a scalable application 210 is migrated to, or launched from, a target device platform (the device platform 202). At block 252, the scalable application 210 determines if an instance of the IR tree will be created on the target device platform. If yes, the application GUI within the scalable application 210 is utilized in conjunction with the scalable GUI library 12 to create an instance of the IR tree at block 254. At block 256, the IR tree representing the application GUI may be transmitted to the transformation server 204. If the instance of the IR tree is not created on the target device platform, the mobile code is transmitted to the transformation server 204 at block 258. The transformation server 204 executes the mobile code at block 260 to create an instance of the IR tree representing the application GUI. As previously discussed, the IR tree is device platform independent and includes properties specified by the application GUI.

At block 264, the capability of the target device platform is transmitted to the transformation server 204. The task manager module 18 prunes unnecessary logical panels and/or SGUI components from the IR tree as a function of the capability of the target device platform at block 266. At block 268, the transformation manager module 20 receives the IR tree from the task manager module 18 and initiates the transformation of the IR tree. Transformation of the IR tree involves dynamically configuring the SGUI components represented in the IR tree. The IR tree is transformed to develop the layout of the device platform dependent presentation.

Figure 12:
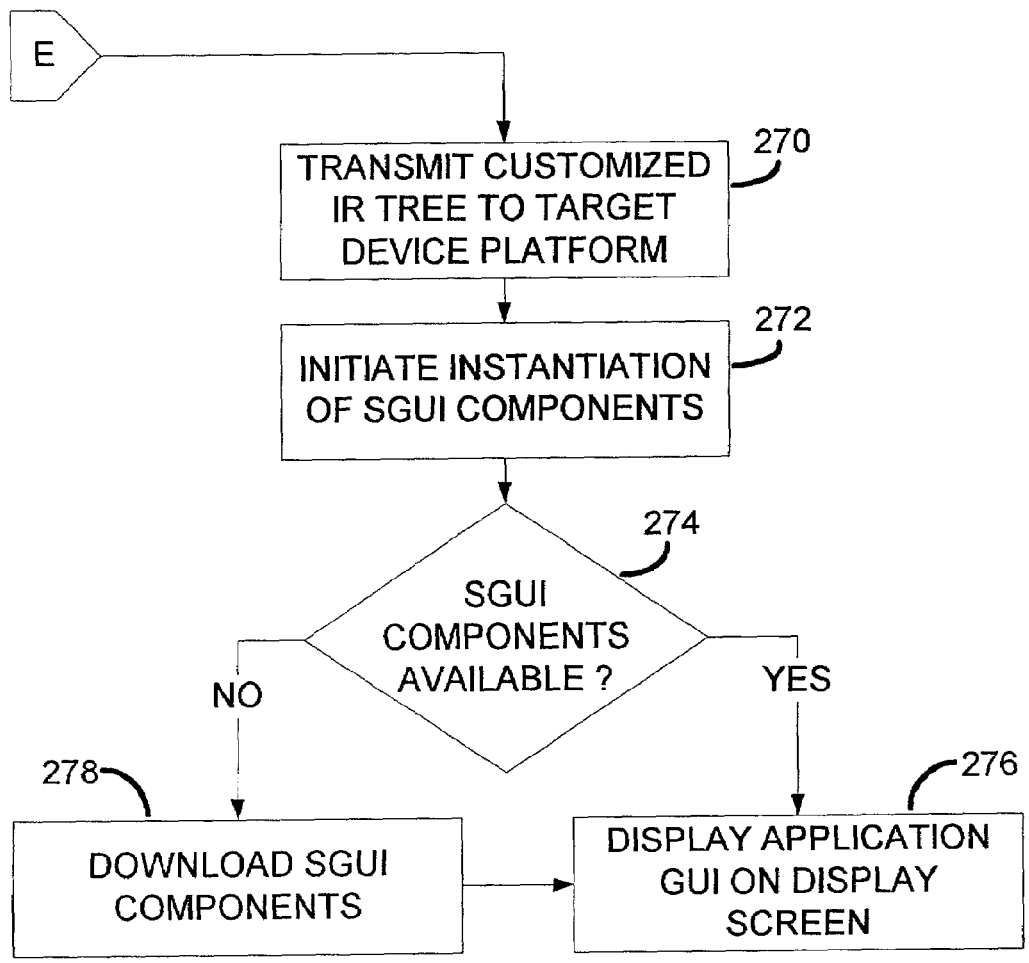
FIG. 12 is a second portion of the flow diagram illustrated in FIG. 11.

Referring now to FIG. 12, following transformation, the device dependent IR tree is transmitted to the target device platform at block 270. At block 272, the render manager module 16 begins the process of traversing the device dependent IR tree and instantiating the SGUI components. The render manager module 16 determines if each of the SGUI components is stored in the scalable GUI component library 12 within the target device platform at block 274. If yes, the render manager module 16 directs the display of the now customized application GUI on the display screen of the device platform 202 at block 276. If the SGUI components are not stored in the scalable GUI component library 22 within the device platform 202, the render manager module 16 dynamically downloads the SGUI components from the library server 206 to the device platform 202 at block 278. The render manager module 16 then directs the display of the now device dependent application GUI on the display screen of the device platform 202 at block 276.

The previously discussed embodiments of the SGUI architecture provide device platform independent operation for application GUIs of scaleable applications. The scalability of the SGUI architecture allows scaleable applications to successfully operate with various display screen sizes, input methods and GUI libraries associated with the user interface of different heterogeneous device platforms. In addition, the overall design of the SGUI architecture allows developers of scaleable applications to become familiar with the SGUI architecture relatively easily while avoiding complexities associated with user interfaces of each of the heterogeneous device platforms on which the scaleable application may operate.

The SGUI architecture allows the use of device platform independent application GUIs within scaleable applications. The application GUIs may be represented by an intermediate representation that is dynamically customized for the target device platform by the SGUI architecture. Customization of the intermediate representation may be based on properties specified by the scaleable application, as well as the capabilities and functionality of the target device platform. Accordingly, the device platform independent application GUIs may be customized by the SGUI architecture to device platform dependent application GUIs for display on any of a plurality of heterogeneous device platforms.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of dynamically adapting a presentation generated by an application to a display screen of any of a plurality of heterogeneous device platforms, the method comprising:
   a) providing a plurality of graphical user interface components in a hierarchical configuration, the graphical user interface components being platform independent with respect to the plurality of heterogeneous device platforms;
   b) arranging the graphical user interface components on a page as a function of the hierarchy; and
   c) creating a device platform dependent presentation by selectively transforming one or more of the graphical user interface components to adjust the size of the page to be closer to the maximum fill of a display screen of one of the heterogeneous device platforms running the application than if filled without transformation, wherein creating the device platform dependent presentation comprises adding one or more graphical user interface components to the page as a function of the hierarchical configuration when the display screen is under-filled by the page.

2. The method of claim 1, wherein b) comprises identifying graphical user interface components representative of the lowest hierarchical level and a highest layout priority within the hierarchical configuration.

3. The method of claim 1, wherein c) comprises reducing the size of the graphical user interface components as a function of transformation rules when the display screen is over-filled by the page.

4. The method of claim 1, wherein c) comprises repeating a), b) and c) to generate another page with the remaining graphical user interface components when the page substantially fills the display screen.

5. The method of claim 1, wherein b) comprises applying a set of style guide parameters to each of the graphical user interface components to create uniformity in the visual appearance of the graphical user interface components.

6. The method of claim 1, wherein b) comprises arranging the graphical user interface components as a function of properties specified by the application.

7. The method of claim 1, wherein c) comprises:
   generating a set of proposed device platform specific pages; and
   selecting at least one device platform specific page from the set to display the graphical user interface components with the display screen.

8. The method of claim 7, wherein generating a set of proposed device platform specific pages comprises sizing each of the proposed device platform specific pages as a function of the graphical user interface components arranged to form each of the proposed device platform specific pages.

9. A method of dynamically adapting a presentation generated by an application to a display screen of any of a plurality of heterogeneous device platforms, the method comprising:
   a) providing a plurality of graphical user interface components in a hierarchical configuration, the graphical user interface components being platform independent with respect to the plurality of heterogeneous device platforms;
   b) arranging the graphical user interface components on a page as a function of the hierarchy; and
   c) creating a device platform dependent presentation by selectively transforming one or more of the graphical user interface components to adjust the size of the page to be closer to the maximum fill of a display screen of one of the heterogeneous device platforms running the application than if filled without transformation, wherein creating the device platform dependent presentation comprises selecting one or more alternative graphical user interface components as a function of transformation rules when the display screen is over-filled by the page.

10. A method of dynamically adapting a presentation generated by a scaleable application to a display screen of any of a plurality of heterogeneous device platforms, the method comprising:
   a) providing an intermediate representation comprising a plurality of container nodes in a hierarchical configuration, the intermediate representation being platform independent with respect to the plurality of heterogeneous device platforms;
   b) identifying a first container node with the lowest hierarchical level and the highest layout priority in the intermediate representation;
   c) arranging on a page at least one graphical user interface component associated with the first container node;
   d) creating a device platform dependent presentation by applying a transformation rule to reduce the size of the at least one graphical user interface component when the page over fills a display screen of one of the heterogeneous device platforms; and
   e) adding at least one graphical user interface component from a hierarchically related container node when the page under fills the display screen.

11. The method of claim 10, wherein d) comprises selecting an appropriate transformation rule as a function of at least one graphical user interface component and capabilities of said one of the heterogeneous device platforms.

12. The method of claim 10, wherein the transformation rule is applied as a function of a ranking indicating the degree of general applicability of the transformation rule to said one of the heterogeneous device platforms.

13. The method of claim 10, wherein applying the transformation rule comprises:
generating a list of possible graphical user interface components sorted by size;
selecting a graphical user interface component from the list; and
interchanging the at least one graphical user interface component arranged on the page in c) with the graphical user interface component from the list.

14. The method of claim 10, wherein d) comprises transforming a graphical user interface component to a graphical user interface component that is specific to said one of the heterogeneous device platforms.

15. The method of claim 10, wherein d) comprises transforming a composite graphical user interface component comprising a plurality of graphical user interface components associated with a container node to a composite graphical user interface component specific to said one of the heterogeneous device platforms.

16. The method of claim 10, wherein e) comprises selecting a container node that is one of a hierarchical sibling or a related higher level container node.

17. The method of claim 10, wherein e) comprises repeating d).

18. The method of claim 10, wherein b) comprises identifying a container node with at least one graphical user interface component as a hierarchical child.

19. The method of claim 10, wherein c) comprises laying out the graphical user interface components on the page as a function of the hierarchical configuration and constraints specified within the application graphical user interface.

20. A system for dynamically adapting a presentation generated with an application to display screen of any of a plurality of heterogeneous device platforms, the system comprising:
a target device platform comprising a display screen, the target device platform operable to initiate instantiation of a hierarchical configuration representing a plurality of graphical user interface components, the graphical user interface components being platform independent with respect to the plurality of heterogeneous device platforms; and
a transformation module operable to selectively arrange the graphical user interface components on a page as a function of the hierarchical configuration,
the transformation module operable to create a device platform dependent presentation by selectively transforming the graphical user interface components to be closer to the maximum fill of the display screen by the page, and
wherein the transformation module is operable to selectively add one or more graphical user interface components to the page as a function of the hierarchical configuration when the display screen is under-filled by the page.

21. The system of claim 20, wherein the hierarchical configuration is an intermediate representation comprising a plurality of container nodes and a plurality of component nodes, the component nodes representing the graphical user interface components.

22. The system of claim 20, wherein the transformation module is operable to selectively resize the graphical user interface components as a function of the target device platform.

23. The system of claim 20, wherein the graphical user interface components comprise device platform independent graphical user interface components.

24. The system of claim 20, wherein the transformation module is operable to transform the graphical user interface components to graphical user interface components that are specific to the target device platform.

25. The system of claim 20, wherein the transformation module is operable to transform a composite graphical user interface component comprising a plurality of graphical user interface components to a composite graphical user interface component that is specific to the target device platform.

26. The system of claim 20, further comprising a set of style guide parameters, the transformation module operable to apply the set of style guide parameters to each of the graphical user interface components in the page, the set of style guide parameters operable to create uniformity in the visual appearance of the graphical user interface components.

27. The system of claim 20, wherein the target device platform comprises one of a pager, a wireless phone, a personal digital assistant, a hand-held personal computer, a vehicle navigation system and a notebook personal computer.

28. The system of claim 20, wherein the transformation module is operable to generate a set of possible device platform specific pages of various sizes and select therefrom.

29. The system of claim 20, wherein the target device platform comprises any one of a plurality of heterogeneous device platforms.

30. A system for dynamically adapting a presentation generated with an application to display screen of any of a plurality of heterogeneous device platforms, the system comprising:
a target device platform comprising a display screen, the target device platform operable to initiate instantiation of a hierarchical configuration representing a plurality of graphical user interface components, the graphical user interface components being platform independent with respect to the plurality of heterogeneous device platforms; and
a transformation module operable to selectively arrange the graphical user interface components on a page as a function of the hierarchical configuration,
the transformation module operable to create a device platform dependent presentation by selectively transforming the graphical user interface components to be closer to the maximum fill of the display screen by the page, wherein the transformation module is operable to selectively exchange graphical user interface components with one or more alternative graphical user interface components as a function of the target device platform.

31. An article of manufacture having one or more recordable media storing instructions thereon which, when executed by a system, causes the system to dynamically adapt a presentation generated by an application to a display screen of any of a plurality of heterogeneous device platforms according to a method comprising:
a) providing a plurality of graphical user interface components in a hierarchical configuration, the graphical user interface components being platform independent with respect to the plurality of heterogeneous device platforms;
b) arranging the graphical user interface components on a page as a function of the hierarchy; and
c) creating a device platform dependent presentation by selectively transforming one or more of the graphical user interface components to adjust the size of the page to be closer to the maximum fill of a display screen of one of the heterogeneous device platforms running the application than if filled without transformation, wherein selectively transforming one or more of the graphical user interface components comprises adding one or more graphical user interface components to the page as a function of the hierarchical configuration when the display screen is under-filled by the page.

32. The article of manufacture of claim 31, wherein arranging the graphical user interface components on a page comprises identifying graphical user interface components representative of the lowest hierarchical level and a highest layout priority within the hierarchical configuration.

33. The article of manufacture of claim 31, wherein selectively transforming one or more of the graphical user interface components comprises reducing the size of the graphical user interface components as a function of transformation rules when the display screen is over-filled by the page.

34. The article of manufacture of claim 31, wherein selectively transforming one or more of the graphical user interface components comprises repeating providing a plurality of graphical user interface components in a hierarchical configuration, arranging the graphical user interface components on a page, and selectively transforming one or more of the graphical user interface components to generate another page with the remaining graphical user interface components when the page substantially fills the display screen.

35. The article of manufacture of claim 31, wherein arranging the graphical user interface components on a page comprises applying a set of style guide parameters to each of the graphical user interface components to create uniformity in the visual appearance of the graphical user interface components.

36. The article of manufacture of claim 31, wherein arranging the graphical user interface components on a page comprises arranging the graphical user interface components as a function of properties specified by the application.

37. The article of manufacture of claim 31, wherein selectively transforming one or more of the graphical user interface components comprises:
generating a set of proposed device platform specific pages; and
selecting at least one device platform specific page from the set to display the graphical user interface components with the display screen.

38. The article of manufacture of claim 37, wherein generating a set of proposed device platform specific pages comprises sizing each of the proposed device platform specific pages as a function of the graphical user interface components arranged to form each of the proposed device platform specific pages.

39. An article of manufacture having one or more recordable media storing instructions thereon which, when executed by a system, causes the system to dynamically adapt a presentation generated by an application to a display screen of any of a plurality of heterogeneous device platforms according to a method comprising:
a) providing a plurality of graphical user interface components in a hierarchical configuration, the graphical user interface components being platform independent with respect to the plurality of heterogeneous device platforms;
b) arranging the graphical user interface components on a page as a function of the hierarchy; and
c) creating a device platform dependent presentation by selectively transforming one or more of the graphical user interface components to adjust the size of the page to be closer to the maximum fill of a display screen of one of the heterogeneous device platforms running the application than if filled without transformation, wherein selectively transforming one or more of the graphical user interface components comprises selecting one or more alternative graphical user interface components as a function of transformation rules when the display screen is over-filled by the page.

40. A method of dynamically adapting a presentation generated by a scaleable application to a display screen of any of a plurality of heterogeneous device platforms, the method comprising:
providing an intermediate representation comprising a plurality of container nodes in a hierarchical configuration, the intermediate representation being platform independent with respect to the plurality of heterogeneous device platforms;
identifying a first container node with the lowest hierarchical level and the highest layout priority in the intermediate representation;
arranging on a page at least one graphical user interface component associated with the first container node;
creating a device platform dependent presentation by
applying a transformation rule to reduce the size of the at least one graphical user interface component when the page over fills a display screen of one of the heterogeneous device platforms; and
adding at least one graphical user interface component from a hierarchically related container node when the page under fills the display screen.

41. The method of claim 40, wherein applying a transformation rule comprises selecting an appropriate transformation rule as a function of at least one graphical user interface component and capabilities of said one of the heterogeneous device platforms.

42. The method of claim 40, wherein the transformation rule is applied as a function of a ranking indicating the degree of general applicability of the transformation rule to said one of the heterogeneous device platforms.

43. The method of claim 40, wherein applying the transformation rule comprises:
generating a list of possible graphical user interface components sorted by size;
selecting a graphical user interface component from the list; and
interchanging the at least one graphical user interface component arranged on the page in c) with the graphical user interface component from the list.

44. The method of claim 40, wherein applying a transformation rule comprises transforming a graphical user interface component to a graphical user interface component that is specific to said one of the heterogeneous device platforms.

45. The method of claim 40, wherein applying a transformation rule comprises transforming a composite graphical user interface component comprising a plurality of graphical user interface components associated with a container node to a composite graphical user interface component specific to said one of the heterogeneous device platforms.

46. The method of claim 40, wherein adding at least one graphical user interface component comprises selecting a container node that is one of a hierarchical sibling or a related higher level container node.

47. The method of claim 40, wherein adding at least one graphical user interface component comprises repeating applying a transformation rule.

48. The method of claim 40, wherein identifying a first container node comprises identifying a container node with at least one graphical user interface component as a hierarchical child.

49. The method of claim 40, wherein arranging on a page at least one graphical user interface component comprises laying out the graphical user interface components on the page as a function of the hierarchical configuration and constraints specified within the application graphical user interface.

50. An apparatus for dynamically adapting a presentation generated by an application to a display screen of any of a plurality of heterogeneous device platforms, the apparatus comprising:

means for providing an intermediate representation comprising a plurality of container nodes in a hierarchical configuration, the intermediate representation being platform independent with respect to the plurality of heterogeneous device platforms;

means for identifying a first container node with the lowest hierarchical level and the highest layout priority in the intermediate representation;

means for arranging on a page at least one graphical user interface component associated with the first container node;

means for creating a device platform dependent presentation by applying a transformation rule to reduce the size of the at least one graphical user interface component when the page over fills a display screen of one of the heterogeneous device platforms; and by means for adding at least one graphical user interface component from a hierarchically related container node when the page under fills the display screen.

* * * * *